(12) United States Patent
Abdelsalam et al.

(10) Patent No.: US 10,388,948 B2
(45) Date of Patent: Aug. 20, 2019

(54) COMPOSITION OF SI/C ELECTRO ACTIVE MATERIAL

(71) Applicant: NEXEON LIMITED, Abingdon, Oxfordshire (GB)

(72) Inventors: Mamdouh Elsayed Abdelsalam, Southampton (GB); Fazil Coowar, Southampton (GB)

(73) Assignee: Nexeon Limited, Abingdon, Oxfordshire (GB)

( * ) Notice: Subject to any disclaimer, the term of this patent is extended or adjusted under 35 U.S.C. 154(b) by 329 days.

(21) Appl. No.: 14/371,814

(22) PCT Filed: Jan. 29, 2013

(86) PCT No.: PCT/GB2013/050190
§ 371 (c)(1),
(2) Date: Jul. 11, 2014

(87) PCT Pub. No.: WO2013/114095
PCT Pub. Date: Aug. 8, 2013

(65) Prior Publication Data
US 2015/0044571 A1     Feb. 12, 2015

(30) Foreign Application Priority Data

Jan. 30, 2012 (GB) .................. 1201540.0
Jan. 30, 2012 (GB) .................. 1201541.8

(51) Int. Cl.
*H01M 4/36* (2006.01)
*H01M 10/28* (2006.01)
(Continued)

(52) U.S. Cl.
CPC ......... *H01M 4/366* (2013.01); *H01M 4/0404* (2013.01); *H01M 4/134* (2013.01);
(Continued)

(58) Field of Classification Search
CPC ........... C01B 2202/32; C01B 2202/36; H01M 10/0525; H01M 10/28; H01M 2220/20;
(Continued)

(56) References Cited

U.S. PATENT DOCUMENTS 4,002,541 A   1/1977 Streander
4,192,720 A   3/1980 Bucker et al.
(Continued)

FOREIGN PATENT DOCUMENTS

CN   1569623 A   1/2005
CN   1967910 A   5/2007
(Continued)

OTHER PUBLICATIONS

Gao et al., Alloy formation in Nanostructured Silicon, Journal of Advanced Materials, 13(11):816-819 (2001).
(Continued)

*Primary Examiner* — Lingwen R Zeng
(74) *Attorney, Agent, or Firm* — William R. Haulbrook; Michael D. Schmitt; Choate, Hall & Stewart LLP

(57) ABSTRACT

A composition comprising a first particulate electroactive material, a particulate graphite material and a binder, wherein at least 50% of the total volume of each said particulate materials is made up of particles having a particle size $D_{50}$ and wherein a ratio of electroactive material $D_{50}$ particle size:graphite $D_{50}$ particle size is up to 4.5:1.

36 Claims, 10 Drawing Sheets

(51) Int. Cl.
- *H01M 4/583* (2010.01)
- *H01M 8/00* (2016.01)
- *H01M 10/0525* (2010.01)
- *H01M 4/38* (2006.01)
- *H01M 4/04* (2006.01)
- *H01M 4/134* (2010.01)
- *H01M 4/587* (2010.01)
- *H01M 4/62* (2006.01)
- *H01M 4/1395* (2010.01)

(52) U.S. Cl.
CPC ........... *H01M 4/364* (2013.01); *H01M 4/386* (2013.01); *H01M 4/583* (2013.01); *H01M 4/587* (2013.01); *H01M 4/625* (2013.01); *H01M 8/00* (2013.01); *H01M 10/0525* (2013.01); *H01M 10/28* (2013.01); *C01B 2202/32* (2013.01); *C01B 2202/36* (2013.01); *H01M 4/1395* (2013.01); *H01M 2220/20* (2013.01); *H01M 2220/30* (2013.01); *Y02E 60/122* (2013.01)

(58) Field of Classification Search
CPC ........... H01M 2220/30; H01M 4/0404; H01M 4/134; H01M 4/1395; H01M 4/364; H01M 4/366; H01M 4/386; H01M 4/583; H01M 4/587; H01M 4/625; H01M 8/00; Y02E 60/122
See application file for complete search history.

(56) References Cited

U.S. PATENT DOCUMENTS

| | | |
|---|---|---|
| 4,363,708 A | 12/1982 | Rauchle et al. |
| 4,686,013 A | 8/1987 | Pensabene et al. |
| 5,395,711 A | 3/1995 | Tahara et al. |
| 5,514,495 A | 5/1996 | Klaus |
| 5,658,691 A | 8/1997 | Suzuki et al. |
| 5,914,183 A | 6/1999 | Canham |
| 6,132,724 A | 10/2000 | Blum |
| 6,190,951 B1 | 2/2001 | Nakahori et al. |
| 6,300,013 B1 | 10/2001 | Yamada et al. |
| 6,334,939 B1 | 1/2002 | Zhou et al. |
| 6,514,395 B2 | 2/2003 | Zhou et al. |
| 7,138,208 B2 | 11/2006 | Tanjo et al. |
| 7,244,513 B2 | 7/2007 | Li et al. |
| 7,311,999 B2 | 12/2007 | Kawase et al. |
| 7,332,339 B2 | 2/2008 | Canham |
| 7,402,829 B2 | 7/2008 | Green |
| 7,479,351 B2 | 1/2009 | Matsubara et al. |
| 7,615,206 B2 | 11/2009 | Sandhage et al. |
| 7,638,239 B2 | 12/2009 | Sato et al. |
| 7,713,849 B2 | 5/2010 | Habib et al. |
| 7,824,801 B2 | 11/2010 | Kogetsu et al. |
| 7,851,086 B2 | 12/2010 | Matsubara et al. |
| 7,879,734 B2 | 2/2011 | Fukutani et al. |
| 8,080,337 B2 | 12/2011 | Higuchi et al. |
| 8,526,166 B2 | 9/2013 | Choi et al. |
| 8,585,918 B2 | 11/2013 | Green et al. |
| 8,597,831 B2 | 12/2013 | Green et al. |
| 8,772,174 B2 | 7/2014 | Green et al. |
| 8,940,192 B2 | 1/2015 | Toyokawa |
| 8,940,437 B2 | 1/2015 | Green et al. |
| 8,945,431 B2 | 2/2015 | Schulz et al. |
| 9,252,426 B2 | 2/2016 | Green |
| 9,548,489 B2 | 1/2017 | Abdelsalam et al. |
| 10,077,506 B2 | 9/2018 | Friend et al. |
| 2001/0044045 A1 | 11/2001 | Sato et al. |
| 2002/0037433 A1 | 3/2002 | Rasmussen et al. |
| 2002/0074972 A1 | 6/2002 | Narang et al. |
| 2002/0121460 A1 | 9/2002 | Moy et al. |
| 2002/0148727 A1 | 10/2002 | Zhou et al. |
| 2002/0164479 A1 | 11/2002 | Matsubara et al. |
| 2003/0054250 A1 | 3/2003 | Kweon et al. |
| 2003/0099883 A1 | 5/2003 | Ochoa et al. |
| 2003/0150378 A1 | 8/2003 | Winterton et al. |
| 2004/0052867 A1 | 3/2004 | Canham |
| 2004/0140222 A1 | 7/2004 | Smedley et al. |
| 2004/0166319 A1 | 8/2004 | Li et al. |
| 2004/0185341 A1 | 9/2004 | Yamamoto et al. |
| 2004/0214085 A1* | 10/2004 | Sheem ................. H01M 4/134 429/218.1 |
| 2005/0031958 A1 | 2/2005 | Fukuoka et al. |
| 2005/0186378 A1 | 8/2005 | Bhatt |
| 2005/0186474 A1 | 8/2005 | Jiang et al. |
| 2005/0233213 A1 | 10/2005 | Lee et al. |
| 2006/0019151 A1 | 1/2006 | Imachi et al. |
| 2006/0099495 A1 | 5/2006 | Suzuki et al. |
| 2006/0102473 A1 | 5/2006 | Bito et al. |
| 2006/0147802 A1 | 7/2006 | Yasuda et al. |
| 2006/0166098 A1 | 7/2006 | Tabuchi et al. |
| 2006/0216603 A1 | 9/2006 | Choi |
| 2006/0251561 A1 | 11/2006 | Farrell et al. |
| 2007/0011102 A1 | 1/2007 | Matsuhira et al. |
| 2007/0020521 A1 | 1/2007 | Obrovac et al. |
| 2007/0031733 A1 | 2/2007 | Kogetsu et al. |
| 2007/0054190 A1* | 3/2007 | Fukui ................. H01M 4/0471 429/218.1 |
| 2007/0077490 A1 | 4/2007 | Kim et al. |
| 2007/0099081 A1 | 5/2007 | Matsuda et al. |
| 2007/0105017 A1 | 5/2007 | Kawase et al. |
| 2007/0111101 A1 | 5/2007 | Ohkubo et al. |
| 2007/0111102 A1 | 5/2007 | Inoue et al. |
| 2007/0224508 A1 | 9/2007 | Aramata et al. |
| 2007/0255198 A1 | 11/2007 | Leong et al. |
| 2007/0281216 A1 | 12/2007 | Petrat et al. |
| 2008/0038170 A1 | 2/2008 | Sandhage et al. |
| 2008/0062616 A1 | 3/2008 | Matsuda et al. |
| 2008/0090152 A1 | 4/2008 | Kosuzu et al. |
| 2008/0096110 A1 | 4/2008 | Bito et al. |
| 2008/0113269 A1 | 5/2008 | Yamamoto et al. |
| 2008/0124631 A1 | 5/2008 | Fukui et al. |
| 2008/0145757 A1 | 6/2008 | Mah et al. |
| 2008/0166474 A1 | 7/2008 | Deguchi et al. |
| 2008/0261112 A1 | 10/2008 | Nagata et al. |
| 2008/0280207 A1 | 11/2008 | Patoux et al. |
| 2008/0286654 A1 | 11/2008 | Sawa et al. |
| 2008/0305395 A1 | 12/2008 | Hirose et al. |
| 2009/0004566 A1 | 1/2009 | Shirane et al. |
| 2009/0004568 A1 | 1/2009 | Hirose et al. |
| 2009/0010833 A1 | 1/2009 | Rosenband et al. |
| 2009/0137688 A1 | 5/2009 | Yang |
| 2009/0143227 A1 | 6/2009 | Dubrow et al. |
| 2009/0162750 A1 | 6/2009 | Kawakami et al. |
| 2009/0169985 A1 | 7/2009 | Yamaguchi et al. |
| 2009/0186267 A1 | 7/2009 | Tiegs |
| 2009/0253033 A1 | 10/2009 | Hirose et al. |
| 2009/0301866 A1 | 12/2009 | Zaghib et al. |
| 2010/0008841 A1 | 1/2010 | Rosenkilde |
| 2010/0009261 A1 | 1/2010 | Watanabe |
| 2010/0112442 A1 | 5/2010 | Fujikawa et al. |
| 2010/0112451 A1 | 5/2010 | Shibutani et al. |
| 2010/0112475 A1 | 5/2010 | Natsume et al. |
| 2010/0143773 A1 | 6/2010 | Honbou |
| 2010/0143798 A1 | 6/2010 | Zhamu et al. |
| 2010/0178565 A1* | 7/2010 | Green ................. H01M 4/0492 429/231.95 |
| 2010/0190061 A1 | 7/2010 | Green |
| 2010/0190062 A1 | 7/2010 | Yamamoto et al. |
| 2010/0196760 A1 | 8/2010 | Green |
| 2010/0243951 A1 | 9/2010 | Watanabe et al. |
| 2010/0266902 A1 | 10/2010 | Takano et al. |
| 2010/0273058 A1* | 10/2010 | Lee ....................... H01M 4/133 429/225 |
| 2010/0278931 A1 | 11/2010 | Ashton et al. |
| 2010/0285358 A1 | 11/2010 | Cui et al. |
| 2010/0285367 A1 | 11/2010 | Matsui et al. |
| 2010/0291441 A1 | 11/2010 | Ugaji et al. |
| 2010/0297502 A1 | 11/2010 | Zhu et al. |
| 2010/0330418 A1 | 12/2010 | Liang et al. |
| 2010/0330425 A1 | 12/2010 | Lopatin et al. |
| 2011/0001097 A1 | 1/2011 | Aramata et al. |
| 2011/0008531 A1 | 1/2011 | Mikhaylik et al. |

(56) References Cited

U.S. PATENT DOCUMENTS

| | | |
|---|---|---|
| 2011/0027537 A1 | 2/2011 | Inoue et al. |
| 2011/0039690 A1 | 2/2011 | Niu |
| 2011/0056563 A1 | 3/2011 | Bari |
| 2011/0067228 A1 | 3/2011 | Green |
| 2011/0076560 A1 | 3/2011 | Scordilis-Kelley et al. |
| 2011/0085960 A1 | 4/2011 | Mukasyan et al. |
| 2011/0104480 A1 | 5/2011 | Malekos et al. |
| 2011/0111135 A1 | 5/2011 | Kamiyama et al. |
| 2011/0111279 A1 | 5/2011 | Smithyman et al. |
| 2011/0123866 A1 | 5/2011 | Pan et al. |
| 2011/0163274 A1* | 7/2011 | Plee .................. H01M 4/134 427/78 |
| 2011/0236493 A1 | 9/2011 | Canham et al. |
| 2011/0244328 A1 | 10/2011 | Iriyama et al. |
| 2011/0250498 A1 | 10/2011 | Green et al. |
| 2011/0256452 A1 | 10/2011 | Cho et al. |
| 2011/0269019 A1 | 11/2011 | Green et al. |
| 2011/0281180 A1 | 11/2011 | Kim et al. |
| 2011/0287317 A1 | 11/2011 | Nakanishi |
| 2011/0287318 A1 | 11/2011 | Loveness et al. |
| 2011/0299223 A1 | 12/2011 | Oh et al. |
| 2011/0311873 A1 | 12/2011 | Schulz et al. |
| 2012/0040242 A1 | 2/2012 | Kurasawa et al. |
| 2012/0094178 A1* | 4/2012 | Loveridge ............ H01M 4/134 429/217 |
| 2012/0100438 A1 | 4/2012 | Fasching et al. |
| 2012/0107688 A1 | 5/2012 | Loveridge |
| 2012/0121999 A1 | 5/2012 | Laurencin et al. |
| 2012/0141872 A1 | 6/2012 | Kim et al. |
| 2012/0171566 A1 | 7/2012 | Yoshitake et al. |
| 2012/0255858 A1 | 10/2012 | Maeshima et al. |
| 2012/0315543 A1 | 12/2012 | Wata et al. |
| 2013/0071750 A1 | 3/2013 | Park et al. |
| 2013/0115517 A1 | 5/2013 | Kim et al. |
| 2013/0136986 A1 | 5/2013 | Scoyer et al. |
| 2013/0157127 A1 | 6/2013 | Hirose et al. |
| 2013/0189575 A1 | 7/2013 | Anguchamy et al. |
| 2013/0196158 A1 | 8/2013 | Yoshida et al. |
| 2013/0216907 A1 | 8/2013 | Rayner et al. |
| 2013/0224583 A1 | 8/2013 | Green |
| 2013/0266865 A1 | 10/2013 | Kwon et al. |
| 2013/0337314 A1 | 12/2013 | Essaki et al. |
| 2014/0021415 A1 | 1/2014 | Kang et al. |
| 2014/0023928 A1 | 1/2014 | Jeon et al. |
| 2014/0030599 A1 | 1/2014 | Lee et al. |
| 2014/0050987 A1 | 2/2014 | Park et al. |
| 2014/0087268 A1 | 3/2014 | Kim et al. |
| 2014/0106230 A1 | 4/2014 | Kim et al. |
| 2014/0147751 A1 | 5/2014 | Yang et al. |
| 2014/0162131 A1 | 6/2014 | Friend et al. |
| 2014/0170303 A1 | 6/2014 | Rayner et al. |
| 2014/0193711 A1 | 7/2014 | Biswal et al. |
| 2014/0235884 A1 | 8/2014 | Veinot et al. |
| 2014/0246398 A1 | 9/2014 | Zaghib et al. |
| 2014/0302396 A1 | 10/2014 | Lu et al. |
| 2014/0349183 A1 | 11/2014 | Macklin et al. |
| 2015/0079472 A1 | 3/2015 | Lin et al. |
| 2015/0104705 A1 | 4/2015 | Canham et al. |
| 2015/0221936 A1 | 8/2015 | Huang |
| 2015/0280221 A1 | 10/2015 | Abdelsalam et al. |
| 2015/0303456 A1 | 10/2015 | Yoo et al. |
| 2016/0126538 A1 | 5/2016 | Hanelt et al. |
| 2016/0172670 A1 | 6/2016 | Friend |
| 2016/0197342 A1 | 7/2016 | Lee et al. |
| 2016/0308205 A1 | 10/2016 | Canham et al. |
| 2017/0033357 A1 | 2/2017 | Cho et al. |
| 2017/0040610 A1 | 2/2017 | Otsuka et al. |
| 2017/0047580 A1 | 2/2017 | Cho et al. |
| 2017/0047581 A1 | 2/2017 | Lu et al. |
| 2017/0133674 A1 | 5/2017 | Murphy et al. |
| 2017/0200939 A1 | 7/2017 | Murphy et al. |
| 2017/0214042 A1 | 7/2017 | Cho et al. |
| 2017/0346079 A1 | 11/2017 | Friend et al. |
| 2017/0352883 A1 | 12/2017 | Cho et al. |
| 2018/0034056 A1 | 2/2018 | Cho et al. |
| 2018/0083263 A1 | 3/2018 | Cho et al. |

FOREIGN PATENT DOCUMENTS

| | | |
|---|---|---|
| CN | 101188281 A | 5/2008 |
| CN | 101335342 A | 12/2008 |
| CN | 101442124 A | 5/2009 |
| CN | 101471457 A | 7/2009 |
| CN | 101591478 A | 12/2009 |
| CN | 102157731 A | 8/2011 |
| CN | 103 165 870 A | 6/2013 |
| CN | 103 633 295 A | 3/2014 |
| CN | 103840140 A | 6/2014 |
| CN | 104103807 A | 10/2014 |
| CN | 105742611 A | 7/2016 |
| EP | 0281115 A2 | 9/1988 |
| EP | 1054462 A1 | 11/2000 |
| EP | 1335438 A1 | 8/2003 |
| EP | 1427039 A2 | 6/2004 |
| EP | 1750314 A1 | 2/2007 |
| EP | 1791199 A1 | 5/2007 |
| EP | 2037516 A1 | 3/2009 |
| EP | 2051317 A1 | 4/2009 |
| EP | 2383224 A1 | 11/2011 |
| EP | 2509142 A1 | 10/2012 |
| EP | 2873646 A1 | 5/2015 |
| EP | 2533331 B1 | 8/2015 |
| EP | 3093910 A1 | 11/2016 |
| GB | 980513 A | 1/1965 |
| GB | 2000191 A | 1/1979 |
| GB | 2395059 A | 5/2004 |
| GB | 2464158 A | 4/2010 |
| GB | 2470056 A | 11/2010 |
| GB | 2483372 A | 3/2012 |
| GB | 2495951 A | 5/2013 |
| JP | 06-325765 A | 11/1994 |
| JP | 11-250896 | 9/1999 |
| JP | 2001-266866 A | 9/2001 |
| JP | 2002-151055 A | 5/2002 |
| JP | 2003-077463 A | 3/2003 |
| JP | 2003-100296 A | 4/2003 |
| JP | 2003-303586 A | 10/2003 |
| JP | 2004-185984 A | 7/2004 |
| JP | 2004-214054 A | 7/2004 |
| JP | 2004281317 A | 10/2004 |
| JP | 2005-63955 A | 3/2005 |
| JP | 2005-259697 A | 9/2005 |
| JP | 03714665 B2 | 11/2005 |
| JP | 2006-100244 A | 4/2006 |
| JP | 2006172860 A | 6/2006 |
| JP | 2006-269216 A | 10/2006 |
| JP | 2007-042285 A | 2/2007 |
| JP | 2007-080652 A | 3/2007 |
| JP | 2007-128766 A | 5/2007 |
| JP | 2007-294423 A | 11/2007 |
| JP | 2007-335283 A | 12/2007 |
| JP | 2007318057 A | 12/2007 |
| JP | 2007335198 A | 12/2007 |
| JP | 2008-004460 A | 1/2008 |
| JP | 2008-166013 A | 7/2008 |
| JP | 2008186732 A | 8/2008 |
| JP | 4171904 B2 | 10/2008 |
| JP | 2008-293872 A | 12/2008 |
| JP | 2008305746 A | 12/2008 |
| JP | 2010-021100 A | 1/2010 |
| JP | 4401984 B2 | 1/2010 |
| JP | 2010-080196 A | 4/2010 |
| JP | 2010-218848 A | 9/2010 |
| JP | 2010205609 A | 9/2010 |
| JP | 2011-009228 A | 1/2011 |
| JP | 2011-142021 A | 7/2011 |
| JP | 2011-192629 A | 9/2011 |
| JP | 2011/198614 A | 10/2011 |
| JP | 2012-009457 A | 1/2012 |
| JP | 2012-033317 A | 2/2012 |
| JP | 2012084521 A | 4/2012 |
| JP | 2012084522 A | 4/2012 |

(56) References Cited

FOREIGN PATENT DOCUMENTS

| | | |
|---|---|---|
| JP | 2012-178269 A | 9/2012 |
| JP | 2013-131324 A | 7/2013 |
| KR | 2003-0028241 A | 4/2003 |
| KR | 2008-0091883 A | 10/2008 |
| KR | 10-2011-0072917 A | 6/2011 |
| KR | 2011-0116585 A | 10/2011 |
| KR | 2012-0089512 A | 8/2012 |
| KR | 2012-0093756 A | 8/2012 |
| KR | 10-1204192 B1 | 11/2012 |
| KR | 2012-0120034 A | 11/2012 |
| KR | 2013-0031778 A | 3/2013 |
| KR | 2013-0050704 A | 5/2013 |
| KR | 2013 0107892 A | 10/2013 |
| KR | 2013-0114007 A | 10/2013 |
| KR | 10-1341951 B1 | 12/2013 |
| KR | 2013-0139554 A | 12/2013 |
| KR | 2014-0012351 A | 2/2014 |
| KR | 2014-0022679 A | 2/2014 |
| KR | 20140070227 A | 6/2014 |
| KR | 2014-0100514 A | 8/2014 |
| KR | 10-1441447 B1 | 9/2014 |
| SU | 471402 A1 | 3/1973 |
| SU | 544019 A | 7/1975 |
| WO | WO-97/01193 A1 | 1/1997 |
| WO | WO-2004/049473 A2 | 6/2004 |
| WO | WO-2004/086539 A1 | 10/2004 |
| WO | WO-2005/075048 A1 | 8/2005 |
| WO | WO-2005/096414 A2 | 10/2005 |
| WO | WO-2006/068066 A1 | 6/2006 |
| WO | WO-2006/097380 A1 | 9/2006 |
| WO | WO-2006/135375 A2 | 12/2006 |
| WO | WO-2007/037787 A1 | 4/2007 |
| WO | WO-2007/083152 A1 | 7/2007 |
| WO | WO-2007/083155 A1 | 7/2007 |
| WO | WO-2007/094641 A1 | 8/2007 |
| WO | WO-2008/044683 A1 | 4/2008 |
| WO | WO-2009/010758 A2 | 1/2009 |
| WO | WO-2009/010759 A1 | 1/2009 |
| WO | WO-2009/033082 A2 | 3/2009 |
| WO | WO-2009/050585 A1 | 4/2009 |
| WO | WO-2009/063801 A1 | 5/2009 |
| WO | WO-2009/089018 A2 | 7/2009 |
| WO | WO-2009/128800 A1 | 10/2009 |
| WO | WO-2010/026332 A1 | 3/2010 |
| WO | WO-2010/040985 A1 | 4/2010 |
| WO | WO-2010/128310 A1 | 11/2010 |
| WO | WO-2010/130975 A1 | 11/2010 |
| WO | WO-2010/130976 A1 | 11/2010 |
| WO | WO-2010/139987 A2 | 12/2010 |
| WO | WO-2011/042742 A1 | 4/2011 |
| WO | WO-2011/117436 A1 | 9/2011 |
| WO | WO-2012/028857 A1 | 3/2012 |
| WO | WO-2012/028858 A1 | 3/2012 |
| WO | WO-2012/084570 A1 | 6/2012 |
| WO | WO-2012/093224 A1 | 7/2012 |
| WO | WO-2012/175998 A1 | 12/2012 |
| WO | WO-2013/021630 A1 | 2/2013 |
| WO | WO-2013/024305 A2 | 2/2013 |
| WO | WO-2013/049939 A1 | 4/2013 |
| WO | WO-2013/114094 A1 | 8/2013 |
| WO | WO-2013/128201 A2 | 9/2013 |
| WO | WO-2013/140177 A2 | 9/2013 |
| WO | WO-2013/146658 A1 | 10/2013 |
| WO | WO-2013/179068 A2 | 12/2013 |
| WO | WO-2013/179068 A3 | 1/2014 |
| WO | WO-2014/068318 A1 | 5/2014 |
| WO | WO-2015/041450 A1 | 3/2015 |
| WO | WO-2015/082920 A1 | 6/2015 |
| WO | WO-2015/157358 A1 | 10/2015 |
| WO | WO-2016/102098 A1 | 6/2016 |
| WO | WO-2016/102208 A1 | 6/2016 |
| WO | WO-2016/174023 A1 | 11/2016 |

OTHER PUBLICATIONS

International Search Report, PCT/GB2014/053594, 6 pages, dated May 22, 2015.
Notice of Opposition, EP 2533331 B1, 6 pages, dated May 27, 2016.
Ohara, S. et al., A thin film silicon anode for Li-ion batteries having a very large specific capacity and long cycle life, Journal of Power Sources, (136):303-306 (2004).
Graetz, J. et al., Highly reversible lithium storage in nanostructured silicon, Journal of the Electrochemical Society, 6(9):194-197 (2003).
Huang, Z. et al., Metal-Assisted Chemical Etching of Silicon: A Review, Advanced Materials, 23:285-308 (2011).
International Search Report for PCT/GB2013/050190, 4 pages (dated May 10, 2013).
Lestriez, B. et al., Hierarchical and Resilient Conduction Network of Bridged Carbon Nanotubes and Nanofibers for High-Energy Si Negative Electrodes, Electrochemical and Solid-State Letters, 12(4):76-80 (2009).
Xiao, et al., Stabilization of Silicon Anode for Li-ion Batteries, Journal of the Electrochemical Society, 157(10):1047-1051 (2010).
Yang, J. et al., Si/c composites for high capacity lithium storage materials, Journal of the Electrochemical Society, 6(8):154-156 (2003).
Bang, B.M. et al., Scalable Approach to Multi-Dimensional Bulk Si Anodes via Metal-Assisted Chemical Etching, Energy & Environmental Science, 4:5013-5019 (2011).
Chartier, C. et al., Metal-assisted chemical etching of silicon in $HF-H_2O_2$, Electrochimica Acta, 53(17):5509-5516 (2008).
Chen et al., Mesoporous Silicon Anodes Prepared by Magnesiothermic Reduction for Lithium Ion Batteries, Journal of the Electrochemical Society, 158(9):A1055-A1059 (2011).
Chen, X. et al., A Patterned 3D Silicon Anode Fabricated by Electrodeposition on a Virus-Structured Current Collector, Advanced Function Materials, 21:380-387 (2011).
Choi et al., Silica nanofibres from electrospinning/sol-gel process, J. Mater. Sci. Letters, 22:891-893 (2003).
Hatchard, T. D. and Dahn, J. R., In Situ XRD and Electrochemical Study of the Reaction of Lithium with Amorphous Silicon, Journal of the Electrochemical Society, 151(6):A838-A842 (2004).
International Search and Examination Report, GB1219729.9, 9 pages, dated Mar. 20, 2013.
International Search Report, PCT/GB2012/051475, 5 pages (dated Sep. 19, 2012).
International Search Report, PCT/GB2012/052020, 7 pages, dated Apr. 23, 2014.
International Search Report, PCT/GB2013/050189, 4 pages (dated May 22, 2013).
International Search Report, PCT/GB2013/051472, 8 pages, dated Oct. 12, 2013.
International Search Report, PCT/GB2014/052398, 3 pages, dated Nov. 5, 2014.
Jia et al., Novel Three-Dimensional Mesoporous Silicon for High Power Litium-Ion Battery Anode Material, Advs. Energy Mater., 1:1036-1039 (2011).
Krissanasaeranee et al., Preparation of Ultra-Fine Silica Fibers Using Electrospun Ply(Vinyl Alcohol)/Silatrane Composite Fibers as Precursor, J. Am. Ceram. Soc., 91(9):2830-2835 (2008).
Ma et al., Silver nanoparticles decorated, flexible $SiO_2$ nanofibers with long-term antibacterial effect as reusable wound cover, Colloids and Surfaces A: Physicochem. Eng. Aspects 387:57-64 (2011).
Mallet, J. et al., Growth of silicon nanowires of controlled diameters by electrodeposition in ionic liquid at room temperature, Nanoletters, 8(10):3468-3474 (2008).
Oudenhoven, Jos F. M. et al., All-solid-State Lithium-Ion Microbatteries: A Review of Various Three-Dimensional Concepts, Adv. Energy Mater. 1:10-33 (2011).
Purkid et al., Synthesis and Characterization of $SiO_2$ Nanowires Prepared from Rice Husk Ash, J. Metals, Materials and Minerals, 19(2):33-37 (2009).
Richman et al., Ordered Mesoporous Silicon through Magensium Reduction of Polymer Templated Silica Thin Films, Nano Lett., 8(9):3075-3079 (2008).

(56) References Cited

OTHER PUBLICATIONS

Robinson, D. and Walsh, F.C., The Performance of a 500 Amp Rotating Cylinder Electrode Reactor. Part 1: Current-Potential Data and Single Pass Studies, Hydrometallurgy, 26:93 (1991).
Rongguan, L. et al., Electrodeposited porous-microspheres Li—Si films as negative electrodes in lithium-ion batteries, Journal of Power Sources, 196(8):3868-3873 (2011).
Schmuck, M. et al, Alloying of electrodeposited silicon with lithium—a principal study of applicability as a node material for lithium ion batteries, J. Solid State Electrochem, 14:2203-2207 (2010).
Search Report, GB0818645.4, 2 pages (dated Jan. 25, 2010).
Search Report, GB1110785.1, 2 pages (dated Jan. 11, 2012).
Shin, H. C. et al., Nanoporous Structures Prepared by an Electrochemical Deposition Process, Advanced Materials, 15:19, 1610-1614 (2003).
Teschke, O. et al., Test cell simulating the operating conditions of water electrolysers for the evaluation of gas evolving electrocatalysts, Journal of Applied Electrochemistry, 13(3):371-376 (1983).
United Kingdom Search Report, GB1114266.8, dated Dec. 22, 2011, 2 pages.
United Kingdom Search Report, GB1203447.6, dated Jun. 25, 2012, 2 pages.
United Kingdom Search Report, GB1209843.0, dated Jul. 23, 2012, 1 page.
Wachtler, M. et al., Anodic materials for rechargeable Li-batteries, Journal of Power Sources 105:151-160 (2002).
Winter, M. et al., Insertion Electrode Materials for Rechargeable Lithium Batteries, Adv. Mater. 10(10):725-763 (1988).
Written Opinion, PCT/GB2014/052398, dated Nov. 5, 2014.
Yu et al., Reversible Storage of Lithium in Silver-Coated Three-Dimensional Macroporous Silicon, Adv. Mater., 22:2247-2250 (2010).
Zhang et al., Vapor-induced solid-liquid-solid process for silicon-based nanowire growth, Journal of Power Sources 195:1691-1697 (2010).
Search Report for GP1201540.0, 1 page (dated Apr. 19, 2012).
Search Report for GP1201541.8, 1 page (dated Apr. 17, 2012).
International Search Report, Application No. GB1414634.4, dated Mar. 9, 2015, 2 pages.
Webb, P.A. and Orr, C., Modern Methods of Particle Characterization, Micromeritics, 17 pages (1998).
Cui, et al. Doping and Electrical Transport in Silicon Nanowires, Journal of Physical Chemistry, 104(22):5213-5216 (2000).
Cullis et al., Structural and Luminescence properties of porous silicon, Applied Physics Reviews, 82(3):909-965 (1997).
Gao, B, Synthesis and Electrochemical Properties of Carbon Nanotubes and Silicon Nanowires, Ph.D. Thesis in Applied and Material Sciences, University of North Carolina Chapel Hill (2001).
GB Patent Application No. 0601319.7, filed Jan. 23, 2006, 14 pages.
Jung, K. H. et al., Developments in Luminescent Porous Si, J. Electrochem. Soc., 140(10):3046-3064 (1993).
Kuriyama, K. et al., Anomalous electrical resistivity and photovoltaic phenomenon in the fast mixed conductor lithium silicide Li12Si17, Physical Review, 38(18):1436-38 (1988).
Li, H. et al., The crystal structural evolution of nano-Si anode caused by lithium insertion and extraction at room temperature, Solid State Ionics 135:181-191 (2000).
Meijer, J.A. et al., Electrical resistivity and 7Li Knight shift of liquid Li—Si alloys, J. Phys. Condens. Matter I, 5283-5289 (1989).
Merriam Webster, Definition of Particle, 1 page.

Morales, Alfredo M. and Lieber, Charles M., A Laser Ablation Method for the Synthesis of Crystalline Semiconductor Nanowires, Science, 279(9):208-211 (1998).
Shih, S. et al., Transmission electron microscopy study of chemically etched porous Si, Applied Physical Letters, 62(5):467-69 (1993).
Sinha, S. et al., Synthesis of Silicon Nanowires and Novel Nano-Dendrite Structures, CP544 Electronic Properties of Novel Materials Molecular Nanostructures, 431-436 (2000).
Sinha, S. et al., Synthesis of silicon nanowires and novel nano-dendrite structures, Journal of Nanoparticle Research 6: 421-425 (2004).
Tarascon, J M. et al., An update of the Li metal-free rechargeable battery based on $Li_{1+x}Mn_2O_4$ cathodes and carbon anodes, Journal of Power Sources, 43-44:689-700 (1993).
Van Schalkwijk, Walter A. and Scrosati, Bruno, Advances in Lithium-Ion Batteries (edited 2002 Excerpts).
Wakihara, M., Recent development in lithium ion batteries, Materials Science and Engineering, R33:109-134 (2001).
Winter, Martin and Brodd, Ralph J., Batteries versus Fuel Cells versus Electrochemical Capacitors, Chem. Rev. 104:4245-4269 (2004).
Zhang, Sheng Shui, A review on electrolyte additives for lithium-ion batteries, Journal of Power Sources, 162:1379-1394 (2006).
Zhou, G. W. et al., Controlled Li doping of Si nanowires by electrochemical insertion methods, Applied Physics Letters, 75(16):2447-2449 (1999).
International Search Report, PCT/GB2015/053984, (Electrodes for Metal-Ion Batteries, filed Jun. 6, 2017), 4 pages, dated Mar. 31, 2016.
International Search Report, PCT/GB2016/050714, (Electroactive Materials for Metal-Ion Batteries, filed Mar. 16, 2016), issued by ISA/European Patent Office, 5 pages, dated Jun. 9, 2016.
Ren, W. et al., Preparation of porous silicon/carbon microspheres as high performance anode materials for lithium ion batteries, Journal of Materials Chemistry A: Materials for Energy and Sustainability, 3(11):5859-5865 (2015).
Written Opinion, PCT/GB2015/053984, (Electrodes for Metal-Ion Batteries, filed Jun. 6, 2017) 6 pages, dated Mar. 31, 2016.
Written Opinion, PCT/GB2016/050714, (Electroactive Materials for Metal-Ion Batteries, filed Mar. 16, 2016), issued by ISA/European Patent Office, 12 pages, dated Jun. 9, 2016.
Abel, P. R. et al., Improving the Stability of Nanostructured Silicon Thin Film Lithium-Ion Battery Anodes through Their Controlled Oxidation, ACS Nano, 6(3):2506-2516, (2012).
Jung, S. C. et al., Anisotropic Volume Expansion of Crystalline Silicon during Electrochemical Lithium Insertion: An Atomic Level Rationale, Nano Letters, 12:5342-5347, (2012).
Liu and Xu, Solution to Homework Assignment #1, University of California, 2 pages, (2013).
Park, M. H. et al., Silicon Nanotube Battery Anodes, Nano Letters, 9(11):3844-3847 (2009).
Stoemenos, J. et al., Silicon on Insulator Obtained by High Dose Oxygen Implantation, Microstructure, and Formation Mechanism, J. Electrochem. Soc., 142(4):1248-1260, (1995).
Su, L. et al., Core Double-shell $Si@SiO_2@C$ nanocomposites as anode materials for Li-ion batteries, Chemical Communication, 46:2590-2592 (2010).
Xu, R. et al., Comparison of sizing small particles using different technologies, Powder Technology, 132:145-153, (2003).

* cited by examiner

COMPOSITION OF SI/C ELECTRO ACTIVE MATERIAL

CROSS-REFERENCE TO RELATED APPLICATION

This patent application is a National Stage Entry of International Patent Application No. PCT/GB2013/050190, filed on Jan. 29, 2013, which claims priority to GB patent application No. 1201540.0, filed on Jan. 30, 2012, which also claims priority to GB patent application No. 1201541.8, filed on Jan. 30, 2012, the entire contents of each of which are hereby incorporated by reference herein.

FIELD OF THE INVENTION

The present invention relates to compositions comprising particles of an electroactive material and additives, and use of said compositions in devices including fuel cells and rechargeable metal ion batteries.

BACKGROUND OF THE INVENTION

Rechargeable metal-ion batteries, for example lithium ion batteries, are extensively used in portable electronic devices such as mobile telephones and laptops, and are finding increasing application in electric or hybrid electric vehicles.

Rechargeable metal ion batteries have an anode layer; a cathode layer capable of releasing and re-inserting metal ions; and an electrolyte between the anode and cathode layers. When the battery cell is fully charged, metal ions have been transported from the metal-ion-containing cathode layer via the electrolyte into the anode layer. In the case of a graphite-based anode layer of a lithium ion battery, the lithium reacts with the graphite to create the compound $Li_xC_6$ ($0<=x<=1$). The graphite, being the electrochemically active material in the composite anode layer, has a maximum capacity of 372 mAh/g.

The use of a silicon-based active anode material, which may have a higher capacity than graphite, is also known.

WO2009/010758 discloses the etching of silicon powder in order to make silicon material for use in lithium ion batteries.

Xiao et al, J. Electrochem. Soc., Volume 157, Issue 10, pp. A1047-A1051 (2010), "Stabilization of Silicon Anode for Li-ion Batteries" discloses an anode comprising silicon particles and Ketjenblack carbon.

Lestriez et al, Electrochemical and Solid-State Letters, Vol. 12, Issue 4, pp. A76-A80 (2009) "Hierarchical and Resilient Conductive Network of Bridged Carbon Nanotubes and Nanofibers for High-Energy Si Negative Electrodes" discloses a composite electrode containing multiwall carbon nanotubes and vapour-grown nanofibres.

US 2011/163274 discloses an electrode composite of silicon, a carbon nanotube and a carbon nanofibre.

It is an object of the invention to provide an anode composition for a metal ion battery that is capable of maintaining a high capacity.

It is a further objection of the invention to provide a composition for forming an anode of a metal ion battery from a slurry.

SUMMARY OF THE INVENTION

In a first aspect, the invention provides a composition comprising a first particulate electroactive material, a particulate graphite material and a binder, wherein at least 50% of the total volume of each said particulate materials is made up of particles having a particle size $D_{50}$ and wherein a ratio of electroactive material $D_{50}$ particle size:graphite $D_{50}$ particle size is up to 4.5:1.

It will be understood that the first particulate electroactive material is different from the particulate graphite material.

Optionally, the ratio is at least 2:1.

Optionally, the ratio is in the range of at least 0.5:1, optionally at least 0.7:1, optionally at least 2:1-4:1, optionally 3:1-4:1.

Optionally, the particulate graphite material forms 0.5-6 wt % of the composition and the ratio is at least 2:1.

Optionally, the particulate graphite material has a BET of at least 3 $m^2/g$.

Optionally, the first particulate electroactive material is a silicon-comprising material.

Optionally, the first particulate electroactive material comprises particles having a particle core and electroactive pillars extending from the particle core.

Optionally, the pillars of the silicon-comprising particles are silicon pillars.

Optionally, the core of the silicon-comprising particles comprises silicon.

Optionally, the silicon-comprising particles consist essentially of n- or p-doped silicon and wherein the pillars are integral with the core.

Optionally, the first particulate electroactive material is provided in an amount of at least 50 wt % of the composition.

Optionally, the composition comprises at least one elongate nanostructure material.

Optionally, the first elongate nanostructure has a mean average diameter of at least 100 nm.

Optionally, the composition comprises at least two elongate nanostructure materials.

Optionally, a second elongate carbon nanostructure material has a mean average diameter of no more than 90 nm, optionally a mean average diameter in the range of 40-90 nm.

Optionally, the first elongate nanostructure:second elongate nanostructure weight ratio is in the range 2.5:1 to 20:1.

Optionally, each of the at least one elongate nanostructure materials has an aspect ratio of at least 50.

Optionally, the first and second carbon elongate nanostructure materials are each independently selected from carbon nanotubes and carbon nanofibres.

Optionally, the first carbon elongate nanostructure material is a nanofibre and the second elongate carbon nanostructure material is a nanotube.

Optionally, the at least one elongate carbon nanostructure materials are provided in a total amount in the range of 0.1-15 weight % of the composition.

Optionally, one or more of the elongate carbon nanostructure materials has a functionalised surface, optionally a surface functionalised with a nitrogen-containing group or an oxygen containing group.

Optionally, the graphite is provide in the composition in an amount of 1-30 wt %, optionally 1-20 wt %.

Optionally, the crystallite length Lc of the graphite is optionally at least 50 nm, optionally at least 100 nm.

Optionally, the composition further comprises carbon black.

Optionally, the carbon black is provided in an amount of at least 0.5 weight % of the composition, and optionally less than 10 wt % of the composition, optionally less than 4 wt % of the composition.

In a second aspect, the invention provides a metal-ion battery comprising an anode, a cathode and an electrolyte between the anode and the cathode wherein the anode comprises a composition according to the first aspect.

In a third aspect the invention provides a slurry comprising a composition according to the first aspect and at least one solvent.

In a fourth aspect the invention provides a method of forming a metal-ion battery according to the second aspect, the method comprising the step of forming an anode by depositing a slurry according to the third aspect onto a conductive material and evaporating the at least one solvent.

Weight percentages of components of a composition described herein are the weight percentages of those components in a porous or non-porous solid composition containing all components of the composition. In the case of a slurry containing a composition, it will be understood that the weight of the one or more solvents of the slurry does not form part of the composition weight as described herein.

DESCRIPTION OF THE DRAWINGS

The invention will now be described in more detail with reference to the drawings, in which.

DETAILED DESCRIPTION OF THE INVENTION

Figure 1:
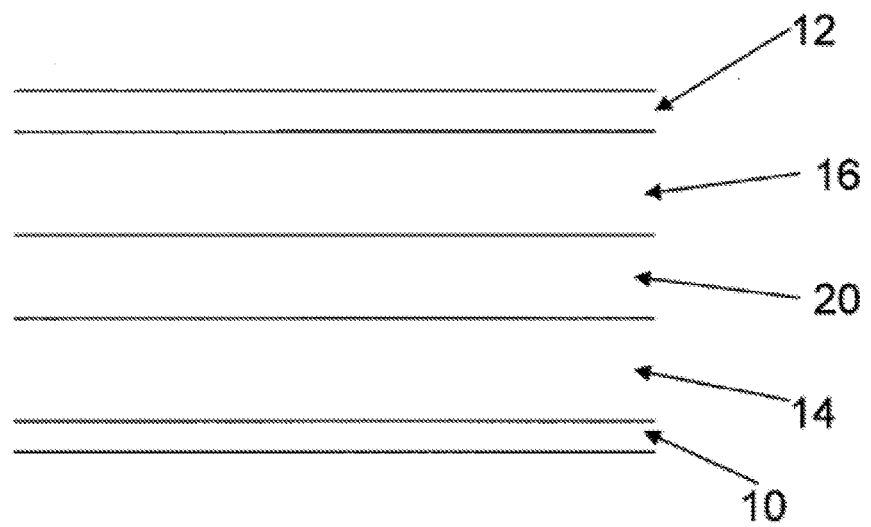
FIG. 1 illustrates schematically a metal ion battery according to an embodiment of the invention.

The structure of a rechargeable metal ion battery cell is shown in FIG. 1, which is not drawn to any scale. The battery cell includes a single cell but may also include more than one cell. The battery is preferably a lithium ion battery, but may be a battery of another metal ion, for example sodium ion and magnesium ion.

The battery cell comprises a current collector for the anode 10, for example copper, and a current collector for the cathode 12, for example aluminium, which are both externally connectable to a load or to a recharging source as appropriate. A composite anode layer containing active silicon particles 14 overlays the current collector 10 and a lithium containing metal oxide-based composite cathode layer 16 overlays the current collector 12 (for the avoidance of any doubt, the terms "anode" and "cathode" as used herein are used in the sense that the battery is placed across a load—in this sense the negative electrode is referred to as the anode and the positive electrode is referred to as the cathode. "Active material" or "electroactive material" as used herein means a material which is able to insert into its structure, and release therefrom, metal ions such as lithium, sodium, potassium, calcium or magnesium during the respective charging phase and discharging phase of a battery. Preferably the material is able to insert and release lithium. Preferred active materials include materials having silicon surface at a surface thereof, for example silicon particles or a composite of a material having a non-silicon core and a surface that is partly or wholly a silicon surface.)

The cathode 12 comprises a material capable of releasing and reabsorbing lithium ions for example a lithium-based metal oxide or phosphate, $LiCoO_2$, $LiNi_{0.8}Co_{0.15}Al_{0.05}O_2$, $LiMn_xNi_xCo_{1-2x}O_2$ or $LiFePO_4$.

A liquid electrolyte may be provided between the anode and the cathode. In the example of FIG. 1, a porous plastic spacer or separator 20 is provided between the anode layer 14 and the lithium containing cathode layer 16, and a liquid electrolyte material is dispersed within the porous plastic spacer or separator 20, the composite anode layer 14 and the composite cathode layer 16. The porous plastic spacer or separator 20 may be replaced by a polymer electrolyte material and in such cases the polymer electrolyte material is present within both the composite anode layer 14 and the composite cathode layer 16. The polymer electrolyte material can be a solid polymer electrolyte or a gel-type polymer electrolyte.

When the battery cell is fully charged, lithium has been transported from the lithium containing metal oxide cathode layer 16 via the electrolyte into the anode layer 14.

A composition according to an embodiment of the invention comprises silicon-comprising particles, a binder and one or more additives. Each additive is preferably a conductive material. Each additive may or may not be an active material.

The silicon-comprising particles may be structured particles. One form of structured particles are particles having a core, which may or may not comprise silicon, with silicon-comprising pillars extending from the core. Another form of structured particles is porous silicon, in particular macroporous silicon, as described in more detail below.

Additives may be selected from: a first elongate carbon nanostructure; one or more further elongate carbon nanostructures; carbon black particles including acetylene black and ketjen black particles; and a material containing graphite or graphene particles. Each elongate carbon nanostructure is preferably selected from a nanotube and a nanofibre. A "nanostructure" material as used herein may mean a material comprising particles having at least one dimension less than 1 micron, preferably less than 500 nm, more preferably less than 200 nm.

Figure 2:
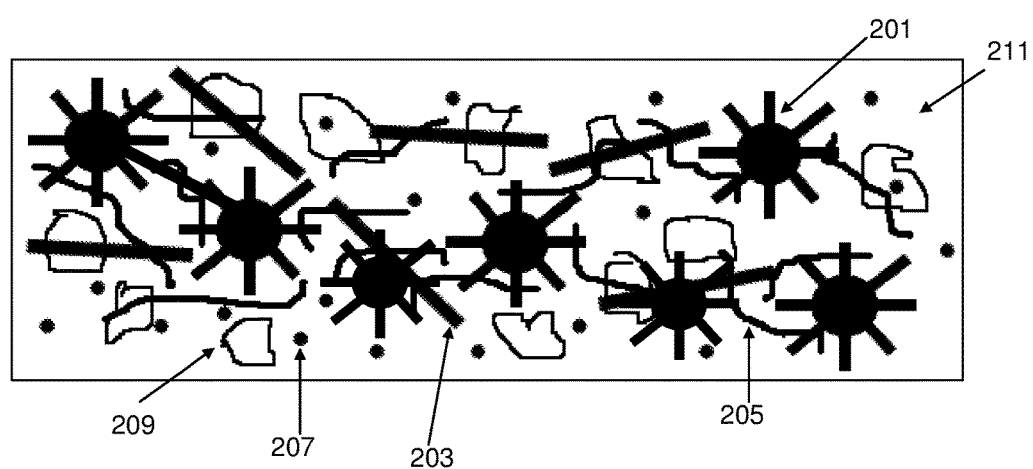
FIG. 2 illustrates schematically a composite electrode according to an embodiment of the invention.

With reference to FIG. 2, which is not drawn to any scale, a composition according to an embodiment of the invention comprises silicon-comprising particles 201, a first elongate nanostructure 203, a second elongate nanostructure 205, carbon black particles 207, graphite particles 209 and binder 211. The silicon-comprising particles 201 illustrated in FIG. 2 are pillared particles having a core with pillars extending from the core, however the silicon-comprising particles may or may not carry pillars.

The second elongate nanostructure material may become entangled with the pillars of the pillared silicon particles, and each nanostructure may wrap around some or all of the perimeter of one or more of the pillared silicon particle cores, and so may extend electronic conductivity beyond the pillared particle surface and/or lower barrier to conduction between the pillared particle surface and other conductive species, including the binder and other additives of the anode. The second elongate nanostructure may also be entangled with other components of the composition, for example graphite (if present).

The pillars, or other structural elements, of the silicon-comprising particles 201 may provide anchors for the nanofibres or nanotubes of the second elongate nanostructure material 205.

The larger diameter of the first elongate nanostructure material 203 may make it more rigid than the second elongate nanostructure material 205. The first elongate nanostructure material 203 may provide conduction paths within the composition that extend along the length of each nanostructure. These conduction paths may form the framework or support for conductive bridges between silicon-comprising particles 201 and between the silicon-comprising particles 201 and other components in the composite such as graphite particles 209.

Compositions of the invention may include only two different elongate nanostructure materials, for example as illustrated in FIG. 2, or may include three or more different elongate nanostructure materials.

Silicon-Comprising Particles

The silicon-comprising particles may be structured particles. Structured particles include particles having a core and pillars extending from the core, and particles having pores on the particle surface or pores throughout the particle volume. A surface of a macroporous particle may have a substantially continuous network of the particle material at a surface of the particle with spaces, voids or channels within the material that may have dimensions of at least 50 nm. Such voids may be present throughout the particle volume or may be restricted to regions of the particle. A particle may have regions of pillars and regions of pores. The pillars themselves may be microporous or mesoporous.

The silicon-comprising particles in compositions of the invention may consist essentially of n- or p-doped silicon or may contain one or more further materials. For example, in the case of pillared particles the particle may be selected from one of the following:

a particle having a silicon core with pillars extending from and integral with the silicon core a particle having a non-silicon core of a conductive material, for example a graphite core, with pillars extending from the core; and a particle having a non-silicon core of a conductive material, for example a graphite core, coated with a silicon shell and having silicon pillars extending from and integral with the silicon shell.

The pillars may be core-shell structures, the inner core being of a different material to the outer shell material and where the core and/or shell contains silicon. In the case where the core and pillars are of different materials, the core may or may not be an electroactive material.

Figure 3A:
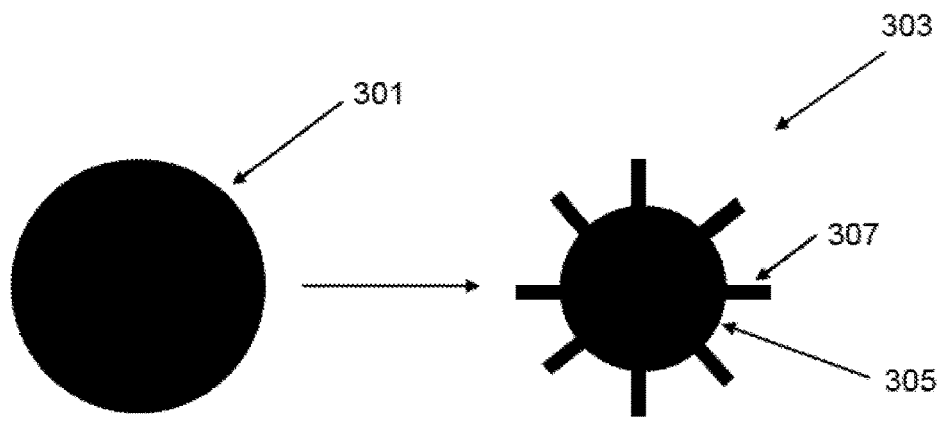
FIG. 3A illustrates schematically a process of forming a pillared particle by an etching process.

FIG. 3A illustrates a first method of forming pillared particles wherein a starting material is etched to form a pillared particle wherein a starting material 301 is exposed to an etching formulation for selective etching at the surface of the starting material to produce a pillared particle 303 having a core 305 and pillars 307.

It will be appreciated that the volume of the particle core of the pillared particle formed by this method is smaller than the volume of the starting material, and the surface of the core is integral with the pillars. The size of the pillared particle may be the same as or less than the size of the starting material.

A suitable process for etching a material having silicon at its surface is metal-assisted chemical etching (alternatively called galvanic exchange etching or galvanic etching) which comprises treatment of the starting material with hydrogen fluoride, a source of metal ions, for example silver or copper, which electrolessly deposit onto the surface of the silicon and an oxidant, for example a source of nitrate ions. More detail on suitable etching processes can be found in, for example, Huang et al., Adv. Mater. 23, pp 285-308 (2011).

The etching process may comprise two steps, including a step in which metal is formed on the silicon surface of the starting material and an etching step. The presence of an ion that may be reduced is required for the etching step. Exemplary cations suitable for this purpose include nitrates of silver, iron (III), alkali metals and ammonium. The formation of pillars is thought to be as a result of etching selectively taking place in the areas underlying the electrolessly deposited metal.

The metal deposition and etching steps may take place in a single solution or may take place in two separate solutions.

Metal used in the etching process may be recovered from the reaction mixture for re-use, particularly if it is an expensive metal such as silver.

Exemplary etching processes suitable for forming pillared particles are disclosed in WO 2009/010758 and in WO 2010/040985.

Other etching processes that may be employed include reactive ion etching, and other chemical or electrochemical etching techniques, optionally using lithography to define the pillar array.

If the pillared particle comprises a first material at its core centre with a shell formed from a second material, for example carbon coated with silicon, then this particle may be formed by etching of silicon-coated carbon to a depth of less than the thickness of the silicon shell in order to form a pillared particle with a composite carbon/silicon core.

Etching may be to a depth of less than 2-10 microns, optionally at least 0.5 microns, to form pillars having a height of up to 10 microns. The pillars may have any shape. For example, the pillars may be branched or unbranched; substantially straight or bent; and of a substantially constant thickness or tapering.

Figure 3B:
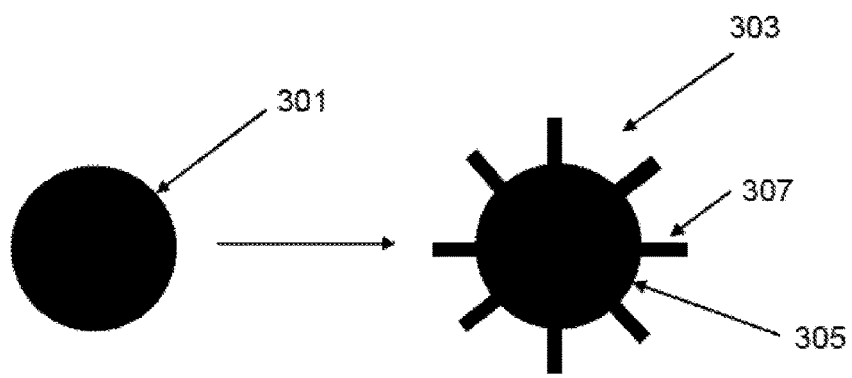
FIG. 3B illustrates schematically a process of forming a pillared particle by growing pillars on a core.

The pillars may be formed on or attached to a particle core using methods such as growing, adhering or fusing pillars onto a core or growing pillars out of a core. FIG. 3B illustrates a second method of forming pillared particles wherein pillars 307, preferably silicon pillars, for example silicon nanowires, are grown on or attached to a starting material 301 such as a silicon or carbon (e.g. graphite or graphene) starting material. The volume of the particle core 305 of the resultant pillared particle 303 may be substantially the same as the volume of the starting material 301. In other words, the surface of the starting material may provide the surface of the particle core 305 from which the pillars 307 extend.

Exemplary methods for growing pillars include chemical vapour deposition (CVD) and fluidised bed reactors utilising the vapour-liquid-solid (VLS) method. The VLS method comprises the steps of forming a liquid alloy droplet on the starting material surface where a wire is to be grown followed by introduction in vapour form of the substance to form a pillar, which diffuses into the liquid. Supersaturation and nucleation at the liquid/solid interface leads to axial crystal growth. The catalyst material used to form the liquid alloy droplet may for example include Au, Ni or Sn.

Nanowires may be grown on one or more surfaces of a starting material.

Pillars may also be produced on the surface of the starting material using thermal plasma or laser ablation techniques.

The pillars may also be formed by nanowire growth out of the starting material using methods such as a solid-liquid-solid growth technique. In one example silicon or silicon-based starting material granules are coated with catalyst particles (e.g. Ni) and heated so that a liquid alloy droplet forms on the surface whilst a vapour is introduced containing another element. The vapour induces condensation of a product containing the starting material and the other element from the vapour, producing growth of a nanowire out of the starting material. The process is stopped before all of the starting material is subsumed into nanowires to produce a pillared particle. In this method the core of the pillared particle will be smaller than the starting material.

Silicon pillars grown on or out of starting materials may be grown as undoped silicon or they may be doped by introducing a dopant during the nanowire growth or during a post-growth processing step.

The pillars are spaced apart on the surface of the core. In one arrangement, substantially all pillars may be spaced apart. In another arrangement, some of the pillars may be clustered together.

The starting material for the particle core is preferably in particulate form, for example a powder, and the particles of the starting material may have any shape. For example, the starting material particles may be cuboid, cuboidal, substantially spherical or spheroid or flake-like in shape. The particle surfaces may be smooth, rough or angular and the particles may be multi-faceted or have a single continuously curved surface. The particles may be porous or non-porous.

A cuboid, multifaceted, flake-like, substantially spherical or spheroid starting material may be obtained by grinding a precursor material, for example doped or undoped silicon as described below, and then sieving or classifying the ground precursor material. Exemplary grinding methods include power grinding, jet milling or ball milling. Depending on the size, shape and form of the precursor material, different milling processes can produce particles of different size, shape and surface smoothness. Flake-like particles may also be made by breaking up/grinding flat sheets of the precursor material. The starting materials may alternatively be made by various deposition, thermal plasma or laser ablation techniques by depositing a film or particulate layer onto a substrate and by removing the film or particulate layer from the substrate and grinding it into smaller particles as necessary.

The starting material may comprise particles of substantially the same size. Alternatively, the starting material may have a distribution of particle sizes. In either case, sieves and/or classifiers may be used to remove some or all starting materials having maximum or minimum sizes outside desired size limits.

In the case where pillared particles are formed by etching a material comprising silicon, the starting material may be undoped silicon or doped silicon of either the p- or n-type or a mixture, such as silicon doped with germanium, phosphorous, aluminium, silver, boron and/or zinc. It is preferred that the silicon has some doping since it improves the conductivity of the silicon during the etching process as compared to undoped silicon. The starting material is optionally p-doped silicon having $10^{19}$ to $10^{20}$ carriers/cc.

Silicon granules used to form the pillared particles may have a silicon-purity of 90.00% or over by mass, for example 95.0% to 99.99%, optionally 98% to 99.98%.

The starting material may be relatively high purity silicon wafers used in the semiconductor industry formed into granules. Alternatively, the granules may be relatively low purity metallurgical grade silicon, which is available commercially and which may have a silicon purity of at least 98%; metallurgical grade silicon is particularly suitable because of the relatively low cost and the relatively high density of defects (compared to silicon wafers used in the semiconductor industry). This leads to a low resistance and hence high conductivity, which is advantageous when the pillar particles or fibres are used as anode material in rechargeable cells. Impurities present in metallurgical grade silicon may include Iron, Aluminium, Nickel, Boron, Calcium, Copper, Titanium, and Vanadium, oxygen, carbon, manganese and phosphorus. Certain impurities such as Al, C, Cu, P and B can further improve the conductivity of the starting material by providing doping elements. Such silicon may be ground and graded as discussed above. An example of such silicon is "Silgrain™" from Elkem of Norway, which can be ground and sieved (if necessary) to produce silicon granules, that may be cuboidal and/or spheroidal.

The granules used for etching may be crystalline, for example mono- or poly-crystalline with a crystallite size equal to or greater than the required pillar height. The polycrystalline granules may comprise any number of crystals, for example two or more.

Where the pillared particles are made by a growth of silicon pillars as described above, the starting material may comprise an electroactive material, and may comprise metal or carbon based particles. Carbon based starting materials may comprise soft carbon, hard carbon, natural and synthetic graphite, graphite oxide, fluorinated graphite, fluorine-intercalated graphite, or graphene.

Graphene based starting materials may comprise particles comprising a plurality of stacked graphene nanosheets (GNS) and/or oxidised graphene nanosheets (ox-GNS), sometimes called Graphite Nano Platelets (GNP) or alternatively nano Graphene Platelets (NGP). NGP (or GNP) may have thicknesses of at least a few nanometers (e.g. at least 2 nm) and larger dimensions of up to 100 μm, preferably less than 40 μm. Materials comprising a plurality of stacked graphene sheets are graphite materials. Methods of making graphene based particles include exfoliation techniques (physical, chemical or mechanical), unzipping of MWCNT or CNT, epitaxial growth by CVD and the reduction of sugars.

The core of the silicon-comprising particle illustrated in FIG. 3 is substantially spherical, however the particle core may have any shape, including substantially spherical, spheroidal (oblate and prolate), and irregular or regular multi-faceted shapes (including substantially cube and cuboidal shapes). The particle core surfaces from which the pillars extend may be smooth, rough or angular and may be multi-faceted or have a single continuously curved surface. The particle core may be porous or non-porous. A cuboidal core may be in the form of a flake, having a thickness that is substantially smaller than its length or width such that the core has only two major surfaces.

The aspect ratio of a pillared particle core having dimensions of length L, width W and thickness T is a ratio of the length L to thickness T (L:T) or width W to thickness T (W:T) of the core, wherein the thickness T is taken to be the smallest of the 3 dimensions of the particle core. The aspect ratio is 1:1 in the case of a perfectly spherical core. Prolate or oblate spheroid, cuboidal or irregular shaped cores preferably have an aspect ratio of at least 1.2:1, more preferably at least 1.5:1 and most preferably at least 2:1. Flake like cores may have an aspect ratio of at least 3:1.

In the case of a substantially spherical core, pillars may be provided on one or both hemispheres of the core. In the case of a multifaceted core, pillars may be provided on one or more (including all) surfaces of the core. For example, in the case of a flake core the pillars may be provided on only one of the major surfaces of the flake or on both major surfaces.

The core material may be selected to be a relatively high conductivity material, for example a material with higher conductivity than the pillars, and at least one surface of the core material may remain uncovered with pillars. The at least one exposed surface of the conductive core material may provide higher conductivity of a composite anode layer comprising the pillared particles as compared to a particle in which all surfaces are covered with pillars.

The silicon particles may have at least one smallest dimension less than one micron. Preferably the smallest dimension is less than 500 nm, more preferably less than 300 nm. The smallest dimension may be more than 0.5 nm. The smallest dimension of a particle is defined as the size of the smallest dimension of an element of the particle such as the diameter for a rod, fibre or wire, the smallest diameter of a cuboid or spheroid or the smallest average thickness for a ribbon, flake or sheet where the particle may consist of the rod, fibre, wire, cuboid, spheroid, ribbon, flake or sheet itself or may comprise the rod, fibre, wire, cuboid, spheroid, ribbon, flake or sheet as a structural element of the particle.

Preferably the particles have a largest dimension that is no more than 100 μm, more preferably, no more than 50 μm and especially no more than 30 μm.

Particle sizes may be measured using optical methods, for example scanning electron microscopy.

Preferably at least 20%, more preferably at least 50% of the silicon particles have smallest dimensions in the ranges defined herein. Particle size distribution may be measured using laser diffraction methods, for example using a MasterSizer® as described in more detail below, or optical digital imaging methods.

Elongate Carbon Nanostructure Materials

A composition of the invention may include one, two or more elongate carbon nanostructure materials in addition to the particulate graphite material described below. A first elongate carbon nanostructure material may have a diameter (or smallest dimension) that is larger than that of the second elongate carbon nanostructure. The second nanostructure material may have a higher surface area per unit mass than the first nanostructure material. The first elongate nanostructure material may have a large enough diameter so that the nanostructure is relatively straight and rigid whereas the second elongate nanostructure may have a small enough diameter such that it can be flexible and curved or bent within the composite. Preferably the diameter (or smallest dimension) of the first elongate carbon nanostructure is at least 100 nm. Preferably the diameter (or smallest dimension) of the second elongate carbon nanostructure is less than 100 nm, more preferably less than 90 nm, more preferably less than 80 nm. Preferably, both the average thickness and average width of each of the first and second elongate carbon nanostructures is less than 500 nm.

Each of the elongate carbon nanostructure materials may have a large aspect ratio, the aspect ratio being the ratio of the largest and smallest dimensions of the material. Preferably, the aspect ratio of the first elongate carbon nanostructure is in the range of about 40 to 180. Preferably the aspect ratio of the second carbon nanostructure is in the range of 200 to 500.

Elongate nanostructures may be selected from nanofibres and/or nanotubes and thin ribbons.

Nanotubes may be single-walled or multi-walled. Preferably, carbon nanotubes used in compositions of the invention are multi-walled. Walls of the nanotubes may be of graphene sheets.

Nanofibres may be solid carbon fibres or may have a narrow hollow core, and may be formed from stacked graphene sheets. An example of a suitable nanofibre material is VGCF® supplied by Showa Denko KK.

Optionally, the elongate nanostructures have a mean average length in the range of 3-50 μm. Preferably the length of the first elongate nanostructure material is in the range 5-30 μm.

Preferably the surface area of each elongate nanostructure material is no more than 100 m$^2$/g and at least 1 m$^2$/g.

The first elongate nanostructure may be a nanofibre having a surface area in the range of 10-20 m$^2$/g The second elongate nanostructure may be a nanotube have a surface area in the range of 40-80 m$^2$/g.

The carbon nanostructures may be functionalised to improve adhesion or connection to other components in the composition, especially the silicon-comprising particles. For example carbon nanotubes can be functionalised with oxygen-containing groups, for example COOH, OH, CO and nitrogen containing groups, for example NH$_2$. The second elongate nanostructure may be a carbon nanotube functionalised with COOH groups which may promote connectivity to the surface of silicon-comprising particles or other electroactive particles.

A composition including a binder, silicon-comprising particles, two or more different elongate carbon nanostructure materials and any further additives may include each of the elongate nanostructure materials in an amount in the range of 0.25-20 weight %, optionally 0.25-10 wt % of the composition. The total amount of the two or more different elongate nanostructure materials in the composition may be in the range of 2-25 weight percent, optionally 3-13 weight percent.

Carbon Black

The composition may comprise carbon black, which may be characterised as a highly conducting particulate carbon, quasigraphitic in nature, composed of aggregates having a complex configuration (including but not limited to chain-like agglomerates) and of colloidal dimensions. Carbon black is typically made via the thermal decomposition and partial combustion of hydrocarbons. Various types of carbon black are available, including acetylene blacks. Examples of commercial products include Ketjen Black® EC600JD or EC300J supplied by AkzoNobel, Vulcan® XC72R manufactured by Cabot Corp, TokaBlack® 5500, 4500, 4400 or 4300 manufactured by Tokai Carbon Co., LTD. and DenkaBlack® FX-35 or HS-100 manufactured by Denki Kagaku Kogyo Kabushiki Kaisha. The composition may comprise a single type of carbon black or a blend of one or more types of carbon black. The carbon black particles may have dimensions in the range of 10-100 nm and a surface area in excess of 50 m²/g.

A composition including a binder, silicon-comprising particles, a first elongate carbon nanostructure and a second elongate carbon nanostructure, carbon black additive(s) and any further additives may include carbon black (of a single type or a blend of a plurality of types) in an amount of at least 0.25 weight % of the composition, and optionally less than 10 wt % of the composition. Preferably, the carbon black is present in an amount in the range 0.5 wt % to 4 wt % of the total composition. Ketjen Black EC600JD with an average particle size of 20-40 nm and a surface area of >1000 m²/g is particularly preferred as an additive.

Graphite Particles

The composition may contain graphite particles, optionally graphite flakes. Optionally the graphite is synthetic graphite.

The crystallite length Lc of the graphite particles is optionally at least 50 nm, optionally at least 100 nm. Graphite with a higher crystallite length Lc may be preferable as this may provide higher conductivity, and higher overall conductivity of the composite. Suitable commercial products of graphite particles may include Timrex® SFG6, SFG10, SFG15, KS4 or KS6 manufactured by Timcal Ltd, 4287 or HPM850 manufactured by Asbury.

Graphite present in an anode of a metal ion battery may function as an active material. Active graphite may provide for a larger number of charge/discharge cycles without significant loss of capacity than active silicon, whereas silicon may provide for a higher capacity than graphite. Accordingly, an electrode composition having both silicon-comprising active particles and a graphite active material may provide a metal ion battery, for example lithium ion battery, with the advantages of both high capacity and a large number of charge/discharge cycles. Depending on the type of graphite material and the charge/discharge conditions, the graphite additive in a silicon based composition may not be fully lithiated during charging and may have a negligible or zero contribution to the electrode capacity above that of the silicon based material. It may be used primarily to improve the overall conductivity of the composition.

Graphite present in the composition may also improve coating properties of a slurry of the composition as compared to a composition in which graphite is absent.

Graphite particles may be provided as a powder having a $D_{50}$ size as measured using laser diffractometry of less than 50 microns, optionally less than 25 microns. Graphite particles may have a BET (Brunauer Emmett Teller) surface area of at least 3 m2/g, optionally at least 5 m²/g or 10 m²/g. Optionally, the graphite particles have a BET value of no more than 300 m²/g, optionally no more than 250 m²/g, optionally no more than 100 m²/g, optionally no more than 50 m²/g.

Dn as used herein (for example, $D_{50}$ or $D_{90}$) means that at least n % of the volume of the material is formed from particles have a measured spherical equivalent volume diameter equal to or less than the identified diameter.

Flake-like graphite particles may have a length, height and thickness wherein both length and width of the particles are each independently on average at least 5 times, optionally at least 10 times, the thickness of the particles. Average thickness of graphite flakes may be in the range of less than 1 micron, optionally 75-300 nm. Average dimensions may be measured from an SEM image of a sample of the particles.

A composition including a binder, silicon-comprising particles, graphite and any further additives may include graphite in an amount in the range of at least 0.5 or at least 1 wt % graphite, optionally 2-30 wt %, optionally 2-15 wt %. The present inventors have surprisingly found that the performance of a metal-ion battery having a composite anode containing both silicon-comprising particles and graphite particles may be affected by the size ratio of the silicon-comprising particles to the graphite particles.

Graphite additives as described herein may be graphene-based particles comprising a plurality of stacked graphene sheets. Graphene-based particles may comprise a plurality of stacked graphene nanosheets (GNS) and/or oxidised graphene nanosheets (ox-GNS), sometimes called Graphite Nano Platelets (GNP) or alternatively nano Graphene Platelets (NGP). NGP (or GNP) may have thicknesses of at least a few nanometers (e.g. at least 2 nm) and larger dimensions of up to 100 μm, preferably less than 40 μm. Methods of making graphene-based particles include exfoliation techniques (physical, chemical or mechanical), unzipping of MWCNT or CNT, epitaxial growth by CVD and the reduction of sugars.

Binder

The binder may be provided to provide cohesion of the particles and, in the case of use in a metal ion battery, for adhesion of the composition to an anode current collector.

The binder material may be a polymeric material, for example polyimide, polyacrylic acid (PAA) and alkali metal salts thereof, polyvinylalchol (PVA), polyvinylidene fluoride (PVDF) and sodium carboxymethylcellulose (Na-CMC) or rubber based binders such as SBR. Mixtures of different binder materials may be used.

The binder may be provided in an amount in the range of 5-30 wt % of the composition.

Composition

The silicon particles and the carbon additives and any other additives may each be provided in the form of a powder or slurry for ease of mixing and blending. For example a slurry can be made by mixing the silicon particles or carbon additives with an appropriate amount of aqueous (e.g. water) and/or non-aqueous (e.g. NMP) solvent. A slurry of a composition comprising the silicon particles, carbon additives and any other additives may be made by mixing all elements together with a solvent or alternatively may be made by first making more than one slurry, each slurry comprising one or more the individual elements of the composition in a solvent and then combining the separate slurries together to create a slurry containing all elements of the composition. The solvents of the separate starting slurries may be the same or may be different, as long as they are miscible when combined. A binder material with or without a solvent may also be added and blended to the composition or slurry. The resulting slurry may be deposited onto a substrate and dried to remove the solvent to form a composition for the electrode of a metal-ion battery.

The inventors have recognised that if a metal ion battery comprising a negative electrode comprising a silicon containing electroactive material is to cycle with a high capacity (for example, in excess of 500 mAh per gram of active material) for in excess of 100-300 charge/discharge cycles, then the electrode composite structure should be uniformly porous and electronically well connected and designed to accommodate the volume changes of the electroactive material during cycling without mechanical or electronic disconnection of the active material from the composite structure.

In order to achieve this, the components within the composite may have moderate values of surface area per unit mass. A high surface area may provide higher reactivity of the active material or improved conductivity from the additives, however if the surface area of the components is too high, excessive formation of a solid-electrolyte interphase (SEI) layer may increase metal ion loss, cause reduction cycle life and cause reduction in porosity. In addition, an excessive surface area of the additives will require a higher content of binder in the composition to effectively bind the components of the composite together and to adhere it to the current collector—which may reduce the overall volumetric capacity and make it difficult to provide an appropriate level of porosity in the composition.

When the composition is mixed with a solvent to form a slurry for depositing the composition onto a current collector, the mix of components with different shapes and varying volumes is preferably such that slurry comprise a uniform mixture with all components equally dispersed and of sufficiently low viscosity to enable thin, uniform coatings to be prepared.

The inventors have discovered that a negative electrode with a composition having the following properties may provide improved cycling performance as described above:

(a) At least 50 wt % active material and no more than 80 wt %, the active material preferably comprising structured silicon particles (b) Binder in the range of 5-30 wt %, preferably 10-20 wt %.

(c) First elongate carbon nanostructure material comprising nanostructures with a smallest dimension of more than 100 nm in the amount of 0.25 to 20 wt %, preferably 3-7 wt %

(d) Second elongate carbon nanostructure material comprising nanostructures with a smallest dimension of less than 100 nm, preferably in the range 30-80 nm, in the amount of 0.25 to 20 wt %, more preferably 2-8 wt %.

(e) Carbon black in the range 0.25 to 10 wt %, preferably 0.5 to 4 wt %.

(f) Graphite particles and/or other additives, fillers and spacers in the range 2-30 wt %

(g) A porosity of at least 10-80%, preferably 20-60%.

wherein the total percentage of the above components adds up to 100 wt %. Preferably the total amount of the first and second elongate carbon nanostructures (c and d) in the composition is in the range 2-25 wt %, especially 3-13 wt %. Preferably the ratio of the mass of the first elongate carbon nanostructure material to the mass of the second elongate carbon nanostructure material is no more than 5:1, most preferably the ratio is in the range 0.1:1 to 5:1 and especially 0.5:1 to 2:1.

Preferably the composition comprises structured silicon particles as described above. The inventors have discovered that all three carbon components c, d and e, within the weight amounts described above may produce a negative electrode with excellent cyclability. Without wishing to be bound by theory, it is believed that by using elongate carbon nanostructures such as MWCNT with diameters in the range 30-80 nm and in the amounts described above, the MWCNT can become entangled with the structural features of the silicon structured particles to form short range conductive networks without excessive filling of the voids or spaces between the said structural features that are necessary to provide space for silicon expansion and access of electrolyte. The larger diameter, rigid first elongate carbon nanostructures, such as VGCF, provide conductive bridges for longer range electronic connections and help to provide a strong mechanical framework within the composition to withstand the volume expansion and contraction of the active material during cycling. It is believed that the highly dispersed carbon black may provide sufficient conductivity in the remaining locations within the composition. However if an excessive amount of any of the carbon additives is used then the effectiveness of the binder may be reduced and the uniformity of the composition may be reduced.

The composition may be formed by mixing the components of the composition, a solvent and optionally one or more of a surfactant, dispersant or porogen, and stirring the mixture. Two or more of the components may first be mixed together in a solvent before being added to the other components for a final mixing stage. The composition may then be deposited on a substrate and dried so that the solvent is evaporated to form a porous composite film.

EXAMPLES

Materials

Compositions were prepared with components selected from the following materials:

Pillared silicon particles formed by etching starting silicon particles available as "Silgrain™" from Elkem of Norway, wherein the starting silicon particles have a $D_{50}$ particle size of 11.5-12.5 microns, or 24.5-25.5 microns as measured using a Mastersizer™ particle size analyzer available from Malvern Instruments Ltd. It will be understood that the resultant pillared particle may have a $D_{50}$ that is smaller than that of the starting material, for example up to 2 or 4 microns smaller respectively.

VGCF carbon nanofibres available from Showa Denko, having an average diameter of 150 nm, an average length of 10-20 microns and a surface area of 13 $m^2/g$.

Multiwalled carbon nanotubes from CheapTubes Inc having an average diameter of 50-80 nm, an average length of 15-20 microns and a surface area of 55-75 $m^2/g$ (hereinafter "MWCNT").

Carbon black material available from AzkoNobel as Ketjenblack® EC600-JD having a surface area of 1400 $m^2/g$ and an average particle size of 20-40 nm.

Carbon black material available from Denka as Denka black having a surface area of 69 $m^2/g$ and an average particle size of 35 nm.

Graphite available as TIMCAL TIMREX® KS4, KS6, SFG6 and SFG10 having $D_{10}$, $D_{50}$ and $D_{90}$ values (measured using a MasterSizer particle size analyser) and BET values as given in Table 2.

A sodium polyacrylate binder, hereinafter referred to as "NaPAA" was formed by partially neutralising commercially available polyacrylic PAA450K using sodium carbonate or sodium hydroxide to a 70% degree of neutralisation. A distribution of the particle sizes of a powder of starting material particles used to form pillared particles may be measured by laser diffraction, in which the particles being measured are typically assumed to be spherical, and in which particle size is expressed as a spherical equivalent volume diameter, for example using the Mastersizer™ particle size analyzer available from Malvern Instruments Ltd. A spherical equivalent volume diameter is the diameter of a sphere with the same volume as that of the particle being measured. If all particles in the powder being measured have the same density then the spherical equivalent volume diameter is equal to the spherical equivalent mass diameter which is the diameter of a sphere that has the same mass as the mass of the particle being measured. For measurement the powder is typically dispersed in a medium with a refractive index that is different to the refractive index of the powder material. A suitable dispersant for powders of the present invention is water. For a powder with different size dimensions such a particle size analyser provides a spherical equivalent volume diameter distribution curve.

Figure 4A:
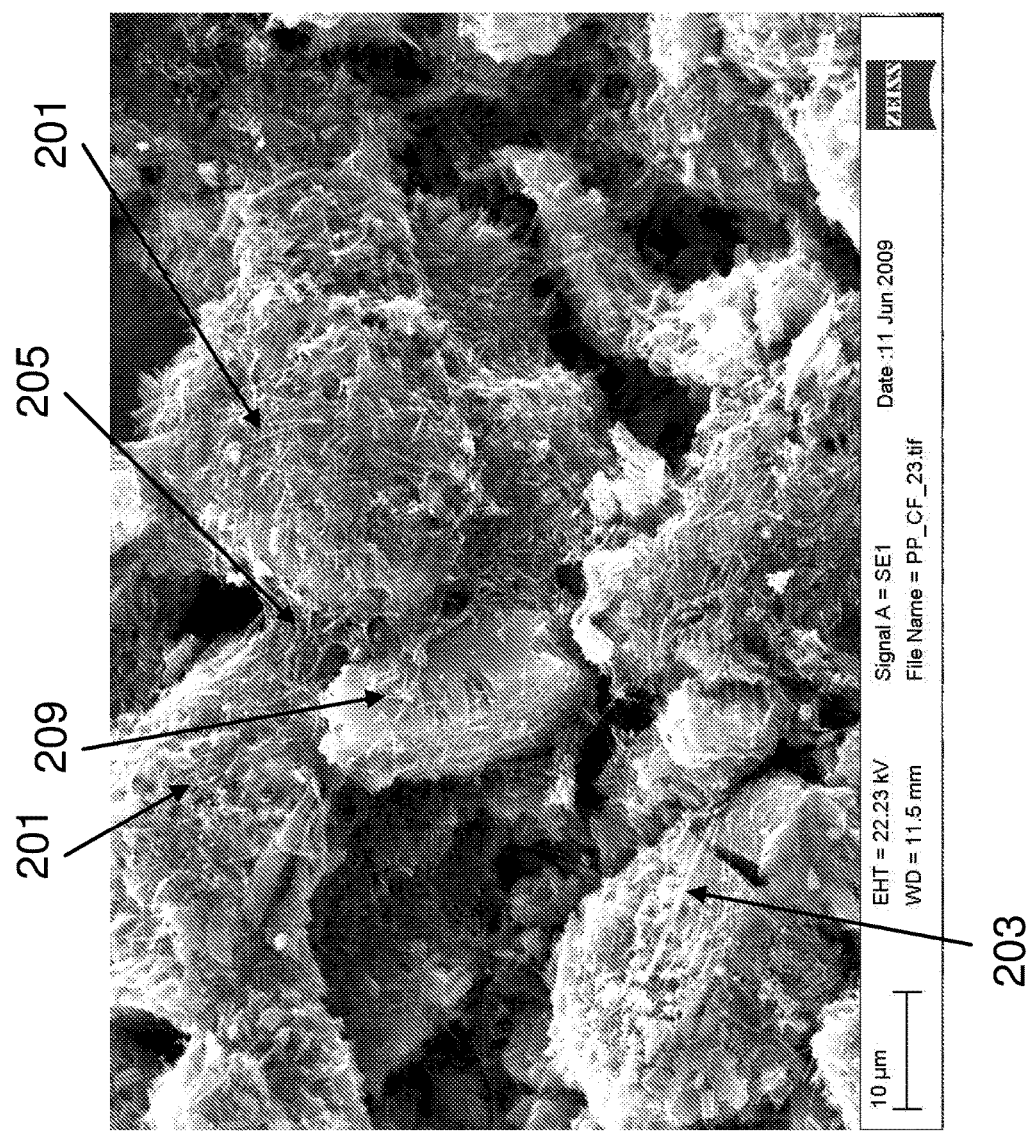
FIG. 4A is a scanning electron microscope image of a composition according to an embodiment of the invention.

FIG. 4A is a SEM image of a composition containing each of the aforementioned components following formation of a slurry of the composition and deposition of the composition onto a copper current collector and evaporation of the slurry solvent to form an anode layer.

The second elongate nanostructures 205, which in this case are multiwalled carbon nanotubes, are entangled with the silicon-comprising particles 201, which in this case are pillared silicon particles. The first elongate nanostructures 203, in this case a nanofibre, provides conductivity over a relatively long range, as shown for the annotated nanofibre 203 bridging two silicon particles.

Figure 4B:
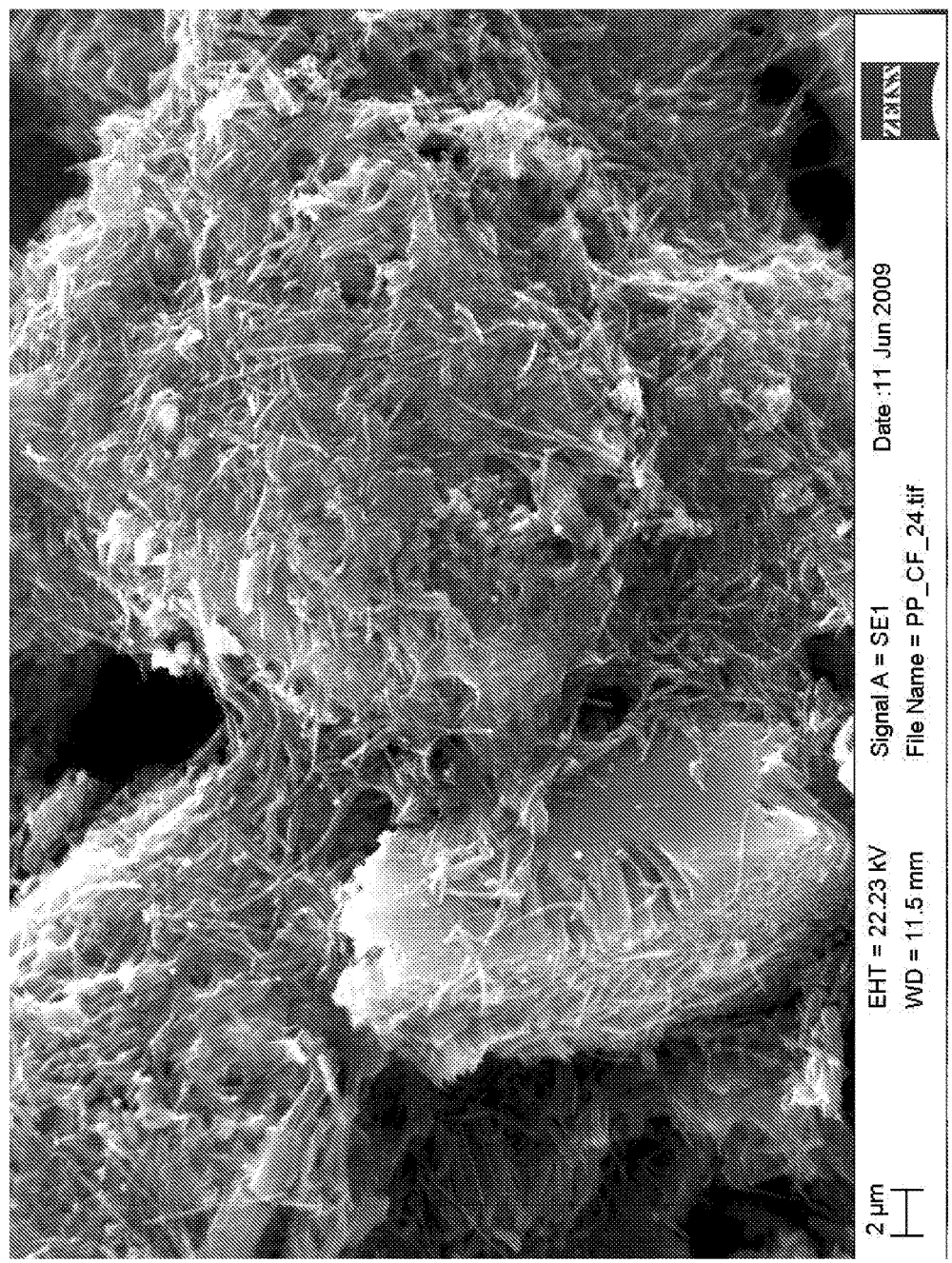
FIG. 4B is a magnification of a region of the image of FIG. 4A.
Figure 4C:
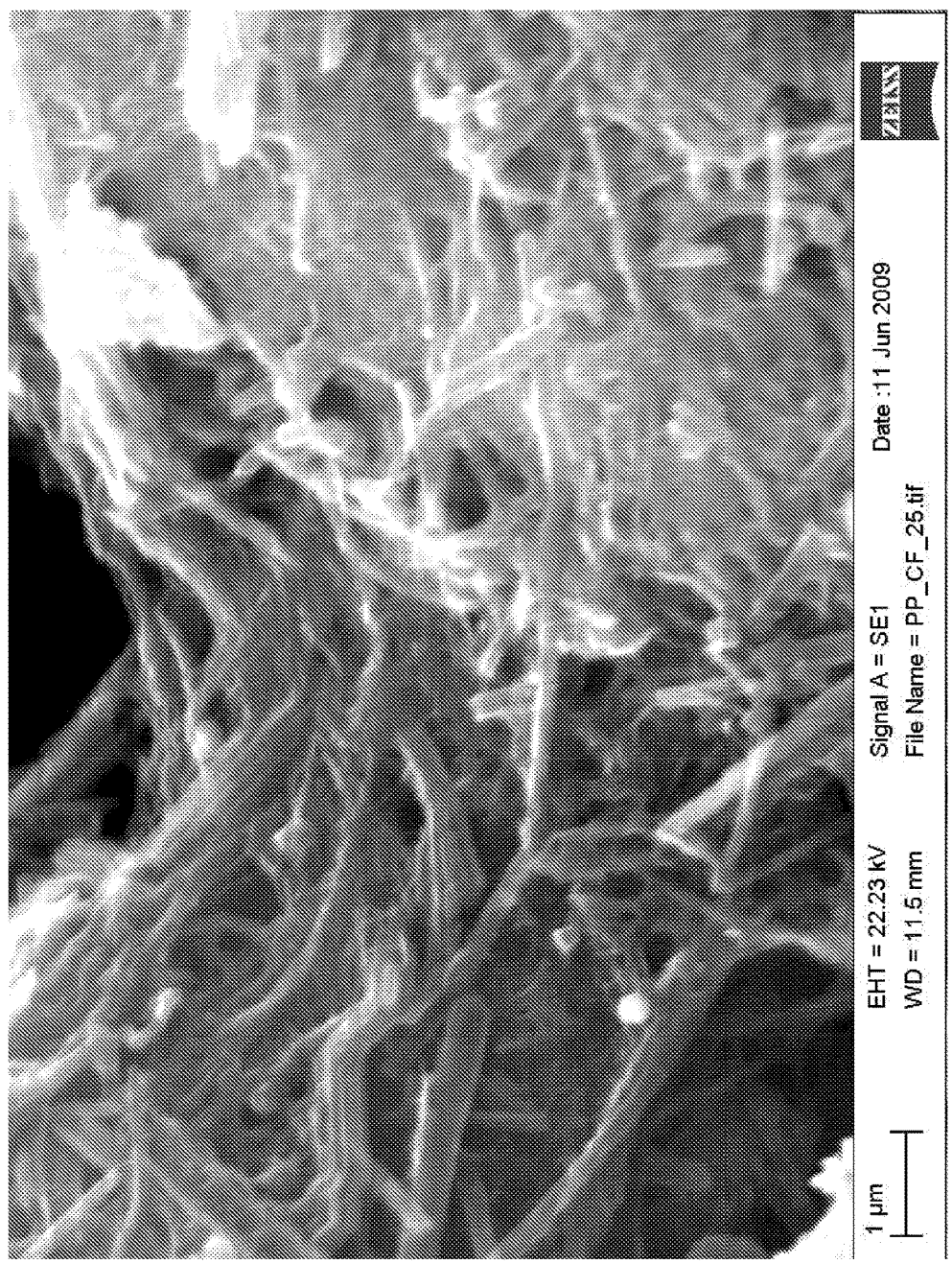
FIG. 4C is a magnification of a region of the image of FIG. 4B.

The nanotubes provide medium range conductivity. Referring to FIGS. 4B and 4C, it can be seen that nanotubes 205 form a bridge extending across two silicon particles 201. The nanotubes and nanoparticles also provide for improved conductivity between the silicon particles and graphite flakes 209 of the composition.

General Device Process 1

Swagelok™-style test cells were constructed using an anode comprising a composition comprising silicon pillared particles as the active material deposited with a coat weight of 13.5-15.5 grams of silicon per $m^2$ onto a 10 μm thick copper foil, an NCA cathode ($Li_{1+x}Ni_{0.8}Co_{0.15}Al_{0.05}O_2$) on an aluminium foil and a Tonen separator between the two electrodes. The electrodes and separator were wetted with an electrolyte solution of 1M $LiPF_6$ in EC/EMC containing VC (vinylene carbonate, 3 wt %, FEC (fluoroethylene carbonate, 10 wt %) and $CO_2$ (0.2 wt %) as additives. The capacity of the NCA cathode was 3 times higher than the capacity of ppSi in the composite electrode that was designed to operate at 1200 mAh/g. The silicon pillared particles were prepared using metal-assisted etching of metallurgical grade silicon particles (with a silicon purity of 99.7-99.95 wt %), to form irregular shaped pillars of lengths 1.5-2.5 μm and thicknesses of 40-150 nm such that the average mass of the pillars was 20-40% of the total silicon mass. The cells were cycled in such a way that the ppSi was charged to 1200 mAh/g and discharged to a cut-off voltage of 2.5V. The cycling rate was C/2 for both charge and discharge. The electrode area was 1.13 $cm^2$.

Device Example 1

Compositions of the following materials in the following weight ratios were prepared:
70 wt % pillared silicon particles (pillared particle $D_{10}$=11 μm, $D_{50}$=21 microns, $D_{90}$=39 μm)
12 wt % binder NaPAA
6 wt % graphite
12 wt % made up of VGCF:multi-wall carbon nanotubes: EC600:Ketjenblack® EC600-JD:Denka black in the ratio of 4:1:1:2. Graphite was varied as shown in Table 1.

TABLE 1

| Example | Graphite Type | Graphite $D_{10}$ (microns) | Graphite $D_{50}$ (microns) | Graphite $D_{90}$ (microns) | Silicon:Graphite $D_{50}$ ratio | Graphite BET surface area ($m^2/g$) | First, second and third cycle efficiencies (%) |
|---|---|---|---|---|---|---|---|
| Comparative Example 1 | KS4 | 1.2 | 2.4 | 4.7 | 8.75 | 26 | 57, 85, 100 |
| Comparative Example 2 | KS6 | 1.6 | 3.4 | 6.5 | 6.18 | 20 | 63, 87, 100 |
| Comparative Example 3 | SFG6 | 1.7 | 3.5 | 6.5 | 6.00 | 17 | 63, 87, 100 |
| Example 1 | SFG10 | 2.8 | 6.6 | 12.8 | 3.18 | 12.5 | 64, 86, 100 |

The similarities in efficiencies for different sizes of graphite indicate that graphite size has little or no effect on first and subsequent cycle efficiencies.

These compositions were used to prepare lithium-ion cells according to the General Device Process. The devices had first, second and third cycle efficiencies as shown in Table 1.

Figure 5A:
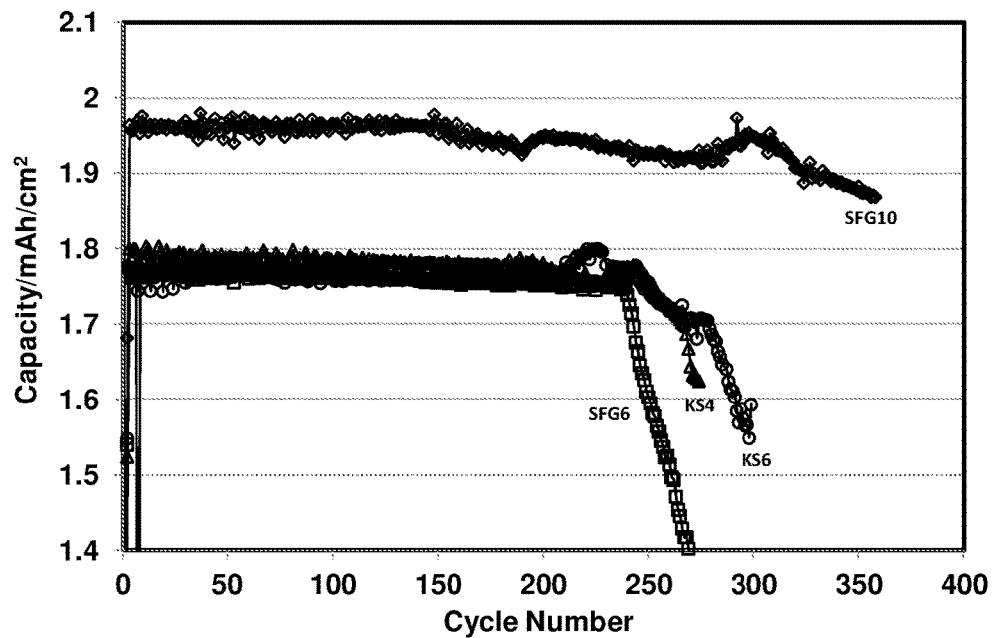
FIG. 5A illustrates variation of electrode capacity density with cycle number for cells according to embodiments of the invention.
Figure 5B:
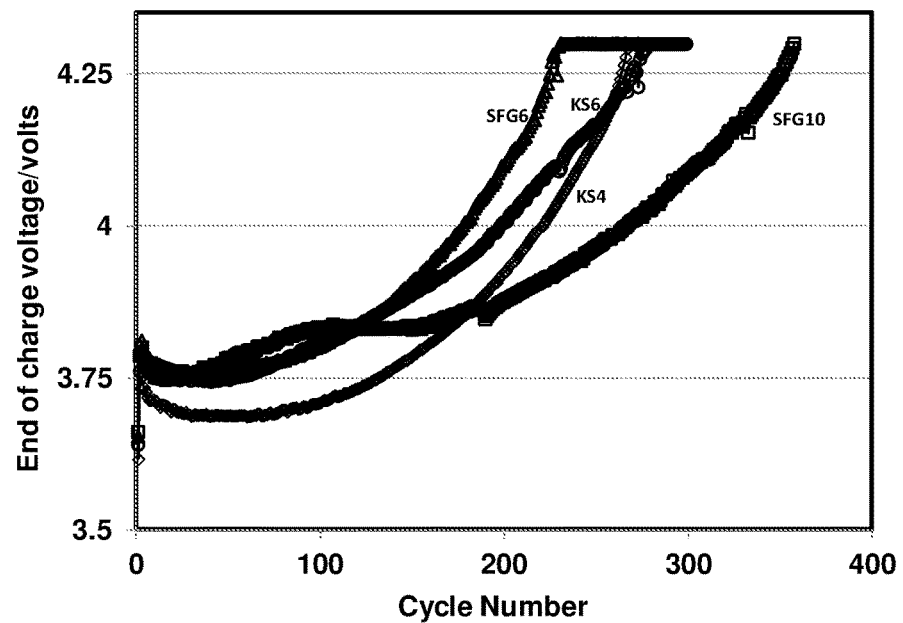
FIG. 5B illustrates variation of end charge voltage with cycle number for the cells of FIG. 5A.

FIG. 5A depicts the evolution of the capacity density of the cells of Comparative Examples 1-3 and Example 1, and FIG. 5B shows the evolution of the end of charge voltage for these cells with cycle number. The end of charge voltage was limited to 4.3V.

FIG. 5B shows that cell resistance increases fastest for the anode of Example Comparative Example 3, containing SFG6. In particular, the cell resistance of Comparative Example 3 increases faster than for Comparative Example 1, containing KS4.

Example 1 delivers the highest capacity density over 350 cycles.

Device Example 2

Devices were prepared as described with reference to Example 1 except that the pillared silicon particles had a $D_{50}$ size of 11 μm, a $D_{90}$ size of 20 μm and a $D_{10}$ size of 6 μm and the graphite was varied as shown in Table 2.

TABLE 2

| Example | Graphite | Graphite $D_{50}$ (microns) | Graphite $D_{90}$ (microns) | Silicon:Graphite $D_{50}$ ratio | Composition coat weight (g-Si/$m^2$) | Graphite BET surface area ($m^2$/g) | First, second and third cycle efficiencies (%) |
|---|---|---|---|---|---|---|---|
| Comparative Example 4 | KS4 | 2.4 | 4.7 | 4.58 | 13.8 | 26 | 69, 80, 100 |
| Comparative Example 5 | KS4 | 2.4 | 4.7 | 4.58 | 13.6 | 26 | 81, 81, 100 |
| Example 2 | SFG6 | 3.5 | 6.5 | 3.14 | 14 | 17 | 77, 81, 100 |

The measured cycling efficiencies in Table 2 indicate that the performance improvement in Example 2 is not simply down to the lower surface area of SFG6 leading to less SEI layer being formed in the first few cycles.

Figure 6A:
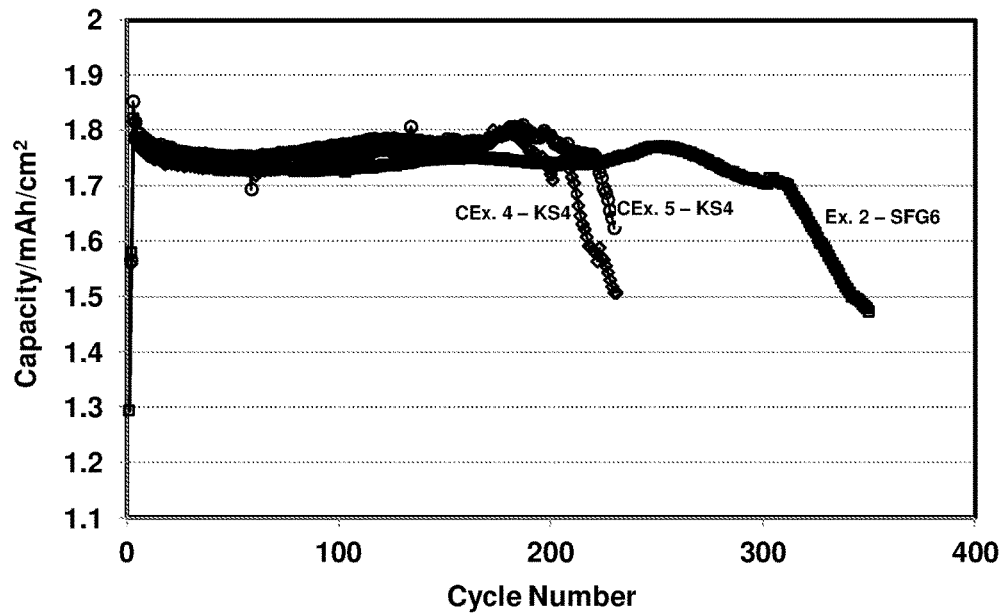
FIG. 6A illustrates variation of electrode capacity density with cycle number for cells according to embodiments of the invention.
Figure 6B:
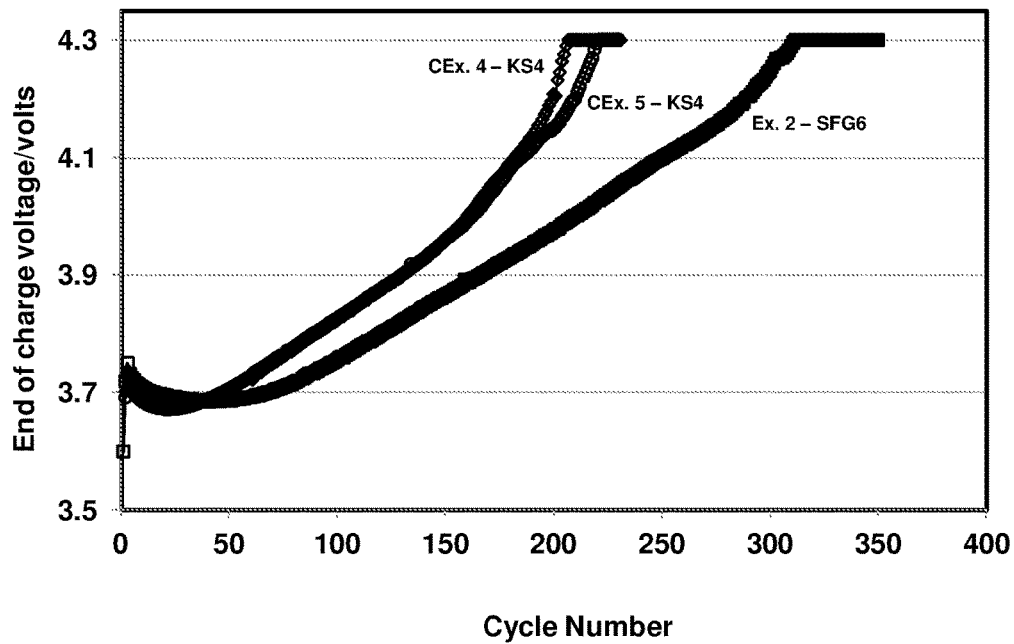
FIG. 6B illustrates variation of end charge voltage with cycle number for the cells of FIG. 6A.

In contrast to the relative performance described above with reference to Comparative Examples 1 and 3, FIG. 6A shows that Example 2 containing SFG6 with pillared silicon particles having a $D_{50}$ of 11 microns maintains its capacity for a larger number of cycles than Comparative Examples 4 and 5 containing KS4, and FIG. 6B shows that cell resistance increases fastest for the anode of Comparative Examples 4 and 5, indicating a relationship between silicon particle size and graphite size for optimum performance. Preferably, the silicon:graphite $D_{50}$ ratio is at least 0:7:1 or at least 2:1, and optionally it is no more than 4.5:1, optionally no more than 4:1.

The preferred silicon:graphite $D_{50}$ ratio may depend on the quantity of graphite present in the composite anode. Optionally, the silicon:graphite $D_{50}$ ratio is in the range 2:1 to 4:1, optionally 3:1 to 4:1 at graphite weight percentages of up to 6 wt %. Optionally, the silicon:graphite $D_{50}$ ratio is in the range 0.7:1 to 4.5:1 at graphite weight percentages above 6 wt %

Device Examples 3-7

Compositions of the following materials in the following weight ratios were prepared:
70 wt % pillared silicon particles (pillared particle $D_{50}$=11.1 microns)
14 wt % binder NaPAA
4 wt % graphite SFG6
12 wt % made up of elongate nanostructures, VGCF and EC600, as shown in Table 3.

TABLE 3

| Example | Nanotube MWCNT (wt %) | VGCF (wt %) | Carbon black EC600 (wt %) | First, second and third cycle efficiencies (%) |
|---|---|---|---|---|
| 3 | 5 | 5 | 2 | 36, 70, 100 |
| 4 | 8 | 1 | 3 | 73, 100, 79 |
| 5 | 0 | 11 | 1 | 79, 76, 100 |
| 6 | 11 | 0 | 1 | 73, 99, 80 |
| 7 | 7 | 1 | 4 | 72, 72, 100 |

These compositions were used to prepare lithium-ion cells according to the General Device Process. The devices had first, second and third cycle efficiencies as shown in Table 3. The nth cycle efficiency is the ratio of the discharge capacity to the preceding charge capacity and provides an indication of the amount of lithium lost or retained within the anode or other cell components during the nth charge-discharge cycle, for example due to formation of the SEI layer.

Figure 7:
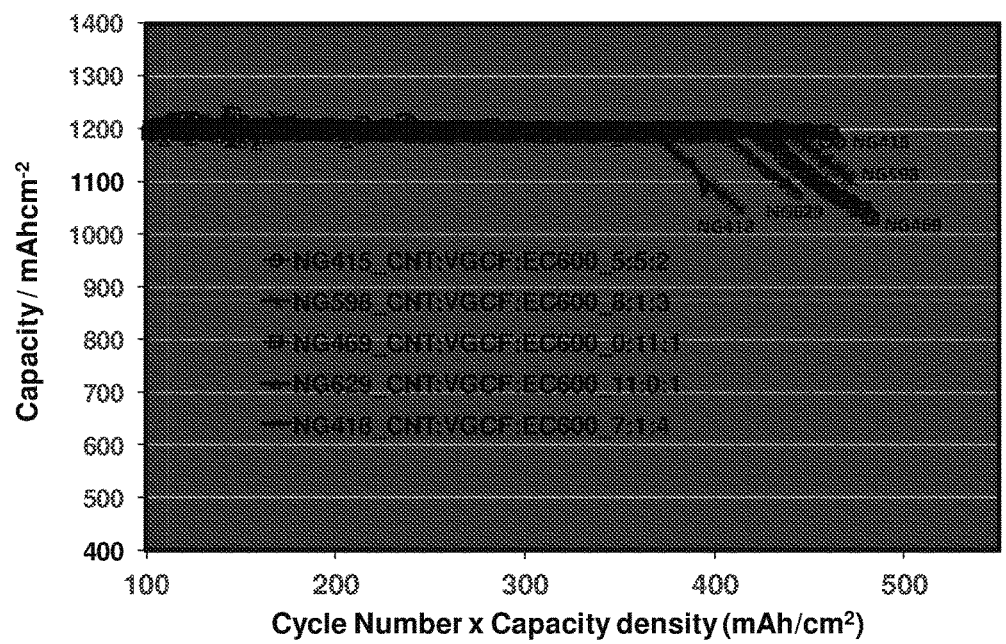
FIG. 7 illustrates variation of specific discharge capacity as a function of the product of the cycle number and electrode capacity density in mAh/cm$^{-2}$ for cells according to embodiments of the invention and comparative devices.

With reference to FIG. 7, normalised capacity starts to decrease at a lower cycle number for devices having compositions in which one of VGCF and MWCNT is not present than for Example 8, in which both VGCF and MWCNT are present.

With reference to FIG. 7, decrease in capacity is fastest for Example 7. Without wishing to be bound by any theory, it is believed that the high level of carbon black in Example 7 may result in a high level of absorption of the binder due to the high surface area per unit mass of the carbon black. Preferably, the weight ratio given by the combined mass of the elongate carbon nanostructures to the mass of the carbon black particles is in the range 3:1 to 20:1.

General Device Process 2

Swagelok™-style test cells were constructed using an anode comprising a composition comprising either silicon pillared particles or unetched (non-pillared) silicon particles as the active material deposited with a coat weight of 30 grams of silicon per $m^2$±5% (total coat weight is about 44 g/$m^2$) onto a 10 μm thick copper foil, an NCA cathode ($Li_{1+x}Ni_{0.8}Co_{0.15}Al_{0.05}O_2$) on an aluminium foil and a Tonen separator between the two electrodes. The electrodes and separator were wetted with a 1M electrolyte solution of 95 wt % $LiPF_6$ and 5 wt % LiBOB in FEC/EMC (1:1 by volume) containing 3 weight % VC additive. The cathode:anode capacity ratio was 3.4:3.

The composite anode had a composition of:
70 wt % silicon (pillared or non-pillared)
14 wt % binder of 70% neutralised Na-PAA with a molecular weight of 450 k
12 wt % graphite additive as set out in Table 4
4 weight percent of a mixture of VGCF:CNT:CB in the weight ratio 5:5:2

The silicon pillared particles used as the active material were prepared using metal-assisted etching of metallurgical grade silicon particles (with a silicon purity of 99.7-99.95 wt %) to form pillared particles wherein D50=11.4 microns and BET=12.2 $m^2$/g, The metallurgical grade silicon powder used as the active material had D50=4.6 microns and BET=2 $m^2$/g.

The cells were charged to 1000 mAh/g at constant current and constant voltage. The first cycle was at C/25 between 4.2 to 3V. The subsequent cycles were at C/3 between 4.1 and 3 V.

First cycle losses were measured using different sections of the anode coatings in half test cells (vs lithium metal foil). This is done so we can exclude the loss due to the cathode.

TABLE 4

| Graphite Type (supplier) | D50 (μm) | BET ($m^2$/g) |
|---|---|---|
| SFG10 (Timcal) | 6.6 | 12 |
| SFG6 (Timcal) | 3.5 | 17 |

TABLE 4-continued

| Graphite Type (supplier) | D50 (μm) | BET (m²/g) |
|---|---|---|
| 4827 (Asbury) | 1.64 | 249 |
| HPM850 (Asbury) | 4.36 | 13 |
| CPreme G5 (Conoco-Phillips) | 6 | 2.8 |

Data for devices prepared according to General Device Process 2 are set out in Table 5.

TABLE 5

| Example | Silicon Type | Graphite type | Silicon/Graphite size ratio | First Cycle loss vs Li (%) |
|---|---|---|---|---|
| Example 8 | Pillared particle D50 = 11.4 μm | SFG10 | 1.73 | 13.4 |
| Example 9 | Pillared particle D50 = 11.4 μm | SFG6 | 3.26 | 12.4 |
| Example 10 | Pillared particle D50 = 11.4 μm | HPM850 | 2.61 | 12.6 |
| Comparative Example 6 | Pillared particle D50 = 11.4 μm | 4827 | 6.95 | 15.4 |
| Example 11 | Pillared particle D50 = 11.4 μm | 1:1 mix of SFG10 & 4827 | 2.80 | 13.2 |
| Example 12 | Powder D50 = 4.6 μm | SFG10 | 0.70 | 14.2 |
| Example 13 | Powder D50 = 4.6 μm | SFG6 | 1.31 | 10.4 |
| Example 14 | Powder D50 = 4.6 μm | 4827 | 2.80 | 12.7 |
| Example 15 | Powder D50 = 4.6 μm | HPM850 | 0.92 | 9.3 |
| Example 17 | Pillared particle D50 = 11.4 μm | G5 | 1.90 | 12.5 |

Comparative example 6, with a silicon:graphite size ratio of >4.5, has a higher first cycle loss than other cells. This cannot be attributed solely to the high BET surface area of the graphite used in Comparative Example 6; the first cycle loss using the same graphite is significantly lower in Example 14 in which the silicon:graphite size ratio is below 4.5.

Furthermore, Example 11 contains a 1:1 mix of the largest (SFG10) and smallest (4827) graphite material which brings the average size and BET down. The size ratio is less than 4.5 and the first cycle loss is reduced as compared to Comparative Example 6.

Preferably first cycle loss of devices according to the invention is less than 15% measured vs Li.

Figure 8:
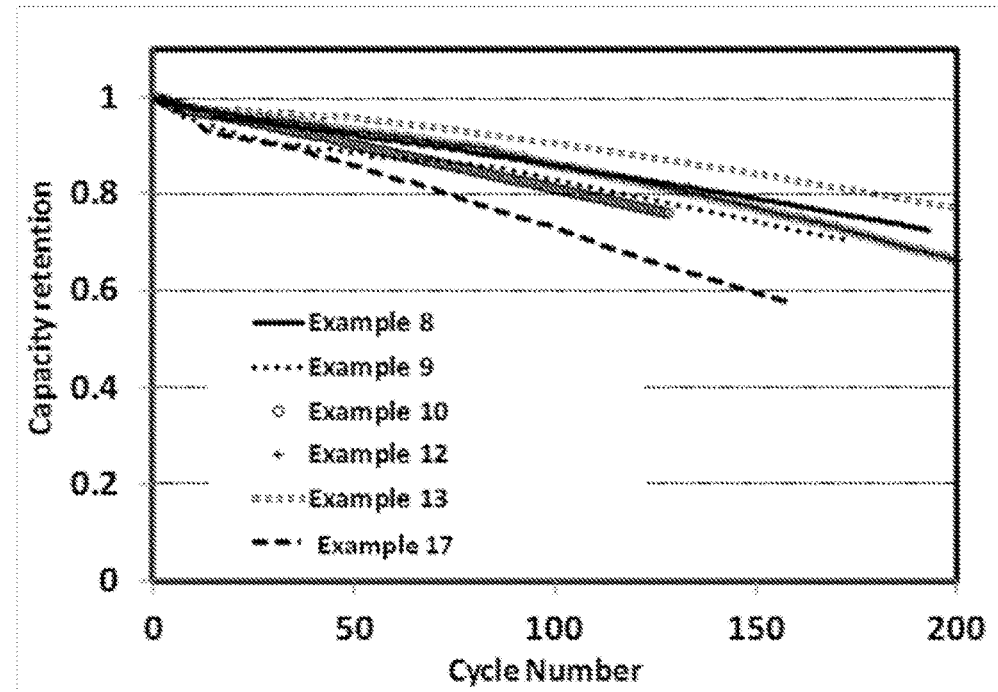
FIG. 8 illustrates capacity retention vs. cycle number for exemplary devices in which dimensions of the graphite additive is varied.

Capacity retention with cycle number for some of the devices of Table 5 is shown in FIG. 8. It can be seen that capacity for Example 17 is lowest. With reference to Table 4, the graphite used in Example 17 has the lowest BET value of the materials studied.

Figure 9A:
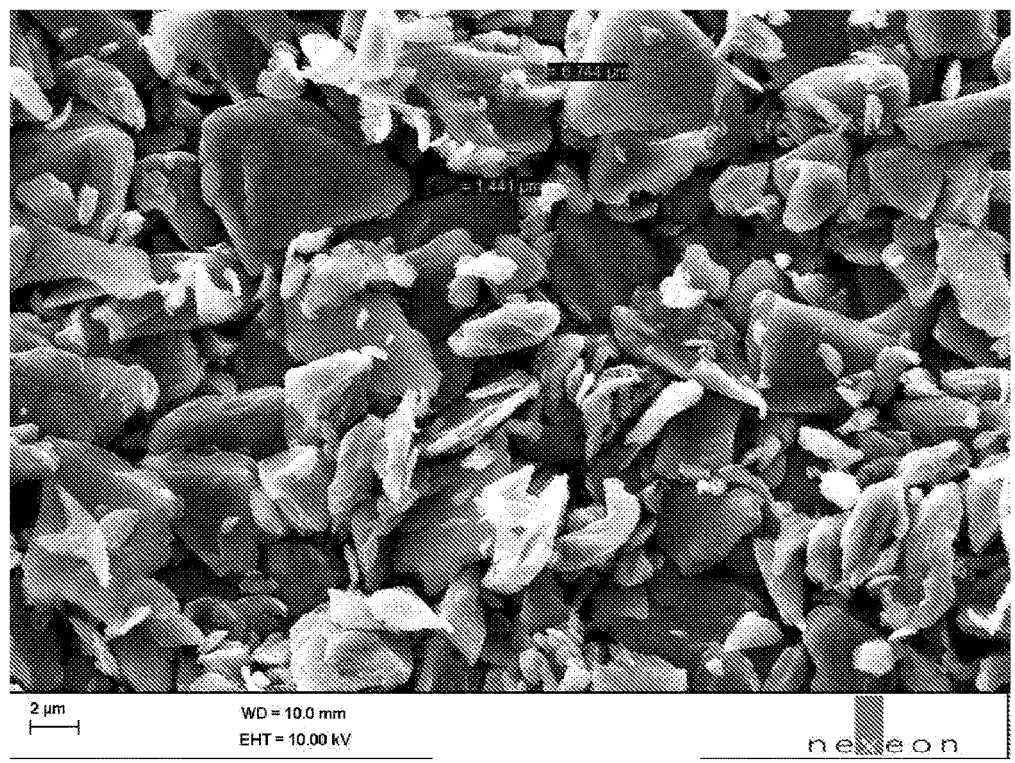
FIG. 9A is a SEM images of graphite CPreme G5.
Figure 9B:
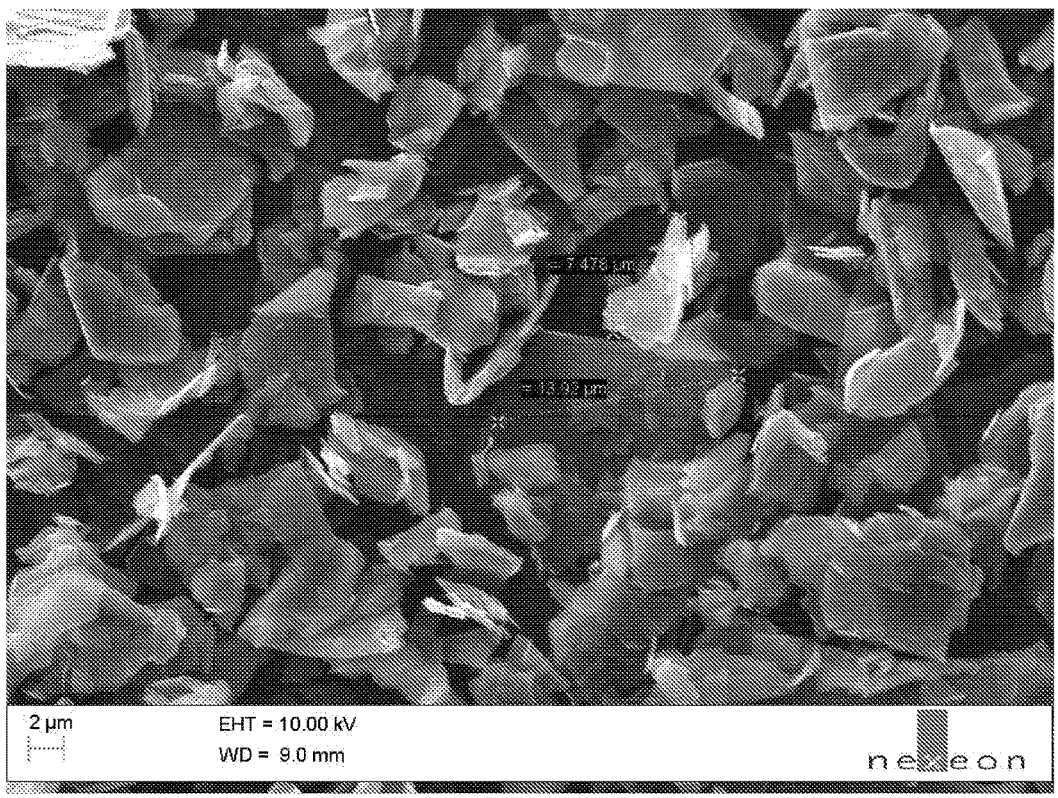
FIG. 9B is a SEM images of graphite SFG10.

FIGS. 9A and 9B are SEM images of graphite CPreme G5 and graphite SFG10 respectively. The CPreme G5 is more rounded than SFG10.

Without wishing to be bound by any theory, it is believed that the more rounded CPreme G5 creates fewer contact points with the silicon and other components in the composite, or the points of contact cover smaller areas, than SFG10. This is borne out by lower composite conductivity for the coating of Example 17 measured as 0.023 S/cm, compared to the coating of Example 7 with a conductivity of 0.081 S/cm.

It will be appreciated that the shape of a particle will affect its BET value. Preferably, the graphite BET is at least 3 m²/g. Natural or synthetic graphite in a high aspect ratio flake form is preferred, for example flakes having a length, height and thickness wherein both length and width of the particles are each independently on average at least 5 times, optionally at least 10 times, the thickness of the particles.

Example 16

A device was prepared according to General Device Process 2 except that the silicon used had a D50 value of 11.5 microns and 4 wt % of SFG6 was used, such that the composite anode comprised Si:Binder:Graphite:Cmix in a ratio of 70:14:4:12 in which Cmix is a mixture of VGCF:CNT:CB in the weight ratio 5:5:2

Details of graphite used in Examples 8 and 9 (reproduced from Tables 4 and 5 above) and Example 16 are summarised in Table 6.

TABLE 6

| Example | Graphite type | Graphite amount (wt %) | Graphite D50 (microns) | Silicon/Graphite size ratio |
|---|---|---|---|---|
| Example 8 | SFG10 | 12 | 6.6 | 1.73 |
| Example 9 | SFG6 | 12 | 3.5 | 3.26 |
| Example 16 | SFG6 | 4 | 3.5 | 3.29 |

The cell had a capacity retention of 133 cycles to reach 80% of capacity. With reference to FIG. 8, this falls between the capacity retention for Examples 8 and 9, described in Table 4.

This indicates that as weight percentage of graphite rises the preferred graphite size falls.

The invention has been described with reference to electroactive silicon as the first particulate electroactive material, however it will be understood that the invention may be applied to other electroactive materials that have a bulk volume expansion of more than 10% when fully lithiated or is capable of having a specific capacity of greater than 300 mAh/g, or any metal or semi-metal that can reversibly form an alloy with lithium. Other exemplary electroactive materials are tin; aluminium; electroactive compounds including oxides, nitrides, fluorides, carbides and hydrides, for example compounds of tin, aluminium and silicon; and alloys thereof.

The invention has been described with reference to rechargeable lithium ion batteries, however it will be understood that the invention may be applied to metal ion batteries generally, and moreover that the invention may be applied to other energy storage devices, for example fuel cells.

Although the present invention has been described in terms of specific exemplary embodiments, it will be appreciated that various modifications, alterations and/or combinations of features disclosed herein will be apparent to those skilled in the art without departing from the scope of the invention as set forth in the following claims.

The invention claimed is:

1. A composition comprising a first particulate electroactive material, 0.5-6 wt % of a particulate graphite material and a binder, wherein 50% of the total volume of each of the first particulate electroactive material and the particulate graphite material is made up of particles having a measured spherical equivalent volume diameter equal to or less than a particle size $D_{50}$ and wherein a ratio of $D_{50}$ particle size of the first particulate electroactive material:$D_{50}$ particle size of the particulate graphite material is at least 2:1 and no more than 4.5:1, wherein the first particulate electroactive material comprises silicon-comprising particles, and wherein the particulate graphite material comprises graphite flakes wherein (i) both a length and a width of the graphite flakes are each independently on average at least 5 times a thickness of the flakes, and/or (ii) the thickness of the flakes is less than 1 micron.

2. The composition according to claim 1, wherein the first particulate electroactive material comprises silicon-comprising structured particles having a particle core and electroactive pillars extending from the particle core.

3. The composition according to claim 2, wherein the electroactive pillars are silicon-comprising pillars.

4. The composition according to claim 3, wherein the silicon-comprising particles consist essentially of n- or p-doped silicon and wherein the pillars are integral with the core.

5. The composition according to claim 1, wherein the first particulate electroactive material is provided in an amount of at least 50 wt % of the composition.

6. The composition according to claim 1, wherein the composition comprises at least one elongate nanostructure material.

7. The composition according to claim 6, wherein the composition comprises at least two elongate nanostructure materials.

8. The composition according to claim 7, wherein a first elongate nanostructure:second elongate nanostructure weight ratio is in a range of 2.5:1 to 20:1.

9. The composition according to claim 7, wherein each of the elongate nanostructure materials has an aspect ratio of at least 50.

10. The composition according to claim 7, wherein the first and second elongate nanostructure materials are each independently selected from carbon nanotubes and carbon nanofibres.

11. The composition according to claim 6, wherein the elongate nanostructure materials are carbon and is provided in a total amount in a range of 2-25 weight % of the composition.

12. The composition according to claim 6, wherein the at least one elongate nanostructure material has a functionalised surface.

13. The composition according to claim 1, wherein a crystallite length Lc of the particulate graphite material is at least 50 nm.

14. The composition according to claim 1, wherein the composition further comprises carbon black.

15. A metal-ion battery comprising an anode, a cathode, and an electrolyte between the anode and the cathode wherein the anode comprises a composition comprising:
a first particulate electroactive material;
0.5-6 wt % of a particulate graphite material; and
a binder,
wherein 50% of the total volume of each of the first particulate electroactive material and the particulate graphite material is made up of particles having a measured spherical equivalent volume diameter equal to or less than a particle size $D_{50}$ and wherein a ratio of $D_{50}$ particle size of the first particulate electroactive material:$D_{50}$ particle size of the particulate graphite material is at least 2:1 and no more than 4.5:1,
wherein the first particulate electroactive material comprises silicon-comprising particles, and wherein the particulate graphite material comprises graphite flakes wherein (i) both a length and a width of the graphite flakes are each independently on average at least 5 times a thickness of the flakes, and/or (ii) the thickness of the flakes is less than 1 micron.

16. A method of forming a metal-ion battery, the metal ion battery comprising an anode, a cathode, and an electrolyte between the anode and the cathode, the method comprising steps of:
forming an anode by depositing a slurry onto a conductive material, the slurry comprising a composition comprising:
a first particulate electroactive material,
0.5-6 wt % of a particulate graphite material, and
a binder,
wherein 50% of the total volume of each of the first particulate electroactive material and the particulate graphite material is made up of particles having a measured spherical equivalent volume diameter equal to or less than a particle size $D_{50}$ and wherein a ratio of $D_{50}$ particle size of the first particulate electroactive material:$D_{50}$ particle size of the particulate graphite material is at least 2:1 and no more than 4.5:1,
wherein the first particulate electroactive material comprises silicon-comprising particles, and wherein the particulate graphite material comprises graphite flakes wherein (i) both a length and a width of the graphite flakes are each independently on average at least 5 times a thickness of the flakes, and/or (ii) the thickness of the flakes is less than 1 micron; and
evaporating the at least one solvent.

17. The composition according to claim 1, wherein the first particulate electroactive material comprises porous silicon-comprising particles.

18. The composition according to claim 1, wherein the first particulate electroactive material comprises macroporous silicon-comprising particles.

19. The composition according to claim 1, wherein the first particulate electroactive material comprises silicon-comprising particles with a smallest dimension of less than 1 μm.

20. The composition according to claim 1, wherein the first particulate electroactive material comprises silicon-comprising particles with a largest dimension of no more than 100 μm.

21. The composition according to claim 1, wherein the particulate graphite material has $D_{50}$ particle size of less than 50 μm.

22. The composition according to claim 1, wherein the particulate graphite material is graphene-based particles comprising a plurality of stacked graphene sheets.

23. The composition according to claim 2, wherein the electroactive pillars are silicon-comprising nanowires.

24. The composition according to claim 6, wherein the first elongate nanostructure has a mean average diameter of at least 100 nm.

25. The composition according to claim 1, wherein the ratio is in a range of 2:1-4:1.

26. The composition according to claim 1, wherein the ratio is in a range of 3:1-4:1.

27. The composition according to claim 7, wherein the second elongate carbon nanostructure material has a mean average diameter of no more than 90 nm.

28. The composition according to claim 7, wherein the second elongate carbon nanostructure material has a mean average diameter in the range of 40-90 nm.

29. The composition according to claim 7, wherein the first carbon elongate nanostructure material is a carbon nanofibre and the second elongate carbon nanostructure material is a carbon nanotube.

30. The composition according to claim 1, wherein a crystallite length Lc of the particulate graphite material is at least 100 nm.

31. The composition according to claim 1, wherein the particulate graphite material has a BET of at least 10 $m^2/g$.

32. The composition according to claim 14, wherein the carbon black is provided in an amount of at least 0.5 weight % of the composition and less than 10 wt % of the composition.

33. The composition according to claim 14, wherein the carbon black is provided in an amount of at least 0.5 weight % of the composition and less than 4 wt % of the composition.

34. The composition according to claim 6, wherein the at least one elongate nanostructure material has a surface functionalised with a nitrogen-containing group or an oxygen containing group.

35. The composition according to claim 1, wherein the first particulate electroactive material comprises silicon-comprising structured particles selected from the group consisting of (i) particles having a core and pillars extending from the core and (ii) particles having pores on the particle surface or pores throughout the particle volume.

36. The composition according to claim 1, wherein the particulate graphite material has a BET of no more than 100 $m^2/g$.

* * * * *